(12) United States Patent
Johnson et al.

(10) Patent No.: US 11,919,212 B2
(45) Date of Patent: Mar. 5, 2024

(54) SELECTIVELY FILLED HOLLOW PROFILES AND METHODS OF PREPARING HOLLOW PROFILES FOR JOINING OPERATIONS

(71) Applicant: Andersen Corporation, Bayport, MN (US)

(72) Inventors: Craig Michael Johnson, North Oaks, MN (US); Jared Asa Shanholtzer, Saint Paul Park, MN (US); Justin Michael Depew, Stillwater, MN (US); Paul Michael Allan Morris, Roseville, MN (US); William Peter Gengler, Hudson, WI (US); Jeffrey Lee Skeels, Oakdale, MN (US); Justin John Reinke, Stillwater, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 17/406,737

(22) Filed: Aug. 19, 2021

(65) Prior Publication Data

US 2022/0055270 A1    Feb. 24, 2022

Related U.S. Application Data

(60) Provisional application No. 63/067,653, filed on Aug. 19, 2020.

(51) Int. Cl.
*B29C 45/14* (2006.01)
*B29C 45/00* (2006.01)
(Continued)

(52) U.S. Cl.
CPC .... *B29C 45/14467* (2013.01); *B29C 45/0005* (2013.01); *B29C 45/0055* (2013.01);
(Continued)

(58) Field of Classification Search
CPC .......... B29C 45/0046; B29C 45/14457; B29C 48/0024; B29C 48/255; B29C 48/2557;
(Continued)

(56) References Cited

U.S. PATENT DOCUMENTS 5,205,102 A    4/1993  Plummer
5,406,768 A    4/1995  Giuseppe et al.
(Continued)

*Primary Examiner* — Jeffrey M Wollschlager
*Assistant Examiner* — Xue H Liu
(74) *Attorney, Agent, or Firm* — Pauly, DeVries Smith & Deffner LLC

(57) ABSTRACT

Embodiments herein relate to hollow profiles and methods of preparing the same for joining operations. A method herein can include placing a dam within a channel defined by the hollow profile, fitting a die block over an end of the channel, and injecting a flowable composition through an injection port into the channel. Another method can include defining a volume within a first member using at least one flow control device, filling the defined volume with a flowable polymeric composition, allowing the flowable polymeric composition to solidify to form a solid portion in the first member, and mechanically modifying the solid portion to define a joining surface suitable for joining to the second member. Other embodiments are also included herein.

21 Claims, 24 Drawing Sheets

(51) Int. Cl.
    *B29K 101/12*     (2006.01)
    *B29L 31/00*     (2006.01)

(52) U.S. Cl.
    CPC ............ *B29C 2045/0058* (2013.01); *B29C 2045/14524* (2013.01); *B29K 2101/12* (2013.01); *B29L 2031/005* (2013.01)

(58) Field of Classification Search
    CPC . B29C 48/00; B29C 66/50–52; B29C 66/522; B29C 66/524; B29K 2045/14524; B29L 2031/005
    USPC .................................................. 264/328.12
    See application file for complete search history.

(56) References Cited

U.S. PATENT DOCUMENTS

| | | |
|---|---|---|
| 5,441,801 A | 8/1995 | Deaner et al. |
| 5,486,553 A | 1/1996 | Deaner et al. |
| 5,497,594 A | 3/1996 | Giuseppe et al. |
| 5,518,677 A | 5/1996 | Deaner et al. |
| 5,539,027 A | 7/1996 | Deaner et al. |
| 5,695,874 A | 12/1997 | Deaner et al. |
| 5,773,138 A | 6/1998 | Seethamraju et al. |
| 5,827,607 A | 10/1998 | Deaner et al. |
| 5,882,564 A | 3/1999 | Puppin |
| 5,922,265 A * | 7/1999 | Parekh ............... B29C 48/08 425/375 |
| 5,932,334 A | 8/1999 | Deaner et al. |
| 5,948,524 A | 9/1999 | Seethamraju et al. |
| 5,981,067 A | 11/1999 | Seethamraju et al. |
| 5,985,429 A | 11/1999 | Plummer et al. |
| 6,004,668 A | 12/1999 | Deaner et al. |
| 6,015,611 A | 1/2000 | Deaner et al. |
| 6,015,612 A | 1/2000 | Deaner et al. |
| 6,054,207 A | 4/2000 | Finley |
| 6,122,877 A | 9/2000 | Hendrickson et al. |
| 6,210,792 B1 | 4/2001 | Seethamraju et al. |
| 6,265,037 B1 | 7/2001 | Godavarti et al. |
| 6,280,667 B1 | 8/2001 | Koenig et al. |
| 6,346,160 B1 | 2/2002 | Puppin |
| 6,357,197 B1 | 3/2002 | Serino et al. |
| 6,453,631 B1 | 9/2002 | Headrick |
| 8,499,509 B2 | 8/2013 | Sibbett |
| 8,652,382 B2 | 2/2014 | Eggert et al. |
| 9,649,795 B2 | 5/2017 | Eggert et al. |
| 10,093,051 B2 | 10/2018 | Eggert et al. |
| 10,093,501 B2 | 10/2018 | Kawajiri et al. |
| 10,550,257 B2 | 2/2020 | Peterson et al. |
| 2017/0240738 A1 | 8/2017 | Ehrlichmann et al. |
| 2018/0272581 A1 * | 9/2018 | Uematsu ........... B29C 45/14418 |

* cited by examiner

SELECTIVELY FILLED HOLLOW PROFILES AND METHODS OF PREPARING HOLLOW PROFILES FOR JOINING OPERATIONS

This application claims the benefit of U.S. Provisional Application No. 63/067,653, filed Aug. 19, 2020, the content of which is herein incorporated by reference in its entirety.

FIELD

Embodiments herein relate to hollow profiles and methods of preparing the same for joining operations. More specifically, embodiments herein relate to hollow profiles including selectively filled portions and methods of preparing the same.

BACKGROUND

Traditional fenestration units (such as window and door products) use solid wood construction for components such as panels, frames, sashes, and the like. This solid construction can provide continuous, planar surfaces that are ideal for mating parts together and joining in accord with various fabrication approaches. In addition, solid profiles provide infinite options for locating fasteners (screws, nails, staples, etc.) to mechanically attach components together.

In contrast to solid profiles, hollow profiles (formed through extrusion, pultrusion, etc.) present challenges for joining mating components together as they are not solid, do not provide anchoring for fasteners in many locations, and can have non-planar and/or discontinuous surfaces depending on the hollow profile design. This makes mating and joining of hollow profiles much more difficult. One approach to these issues is to add screw chases as an extruded or pultruded feature that run parallel to the extrusion and/or pultrusion direction of the hollow profiles and serve to provide an anchor for fasteners such as screws. Unfortunately, however, this approach is inefficient and costly because such features (by virtue of being extruded or pultruded) extend along the entire length of the profile and thus result in substantial additional material in places where fasteners are not used. In addition, adding extruded or pultruded features to aid in mating or joining can present challenges for the pultrusion and/or extrusion process by creating a more complicated extrusion.

SUMMARY

Embodiments herein relate to hollow profiles and methods of preparing the same for joining operations. In a first aspect, a method of preparing a hollow profile for joining is included, the method can include placing a dam within a channel defined by the hollow profile, fitting a die block over an end of the channel, and injecting a flowable composition through an injection port into the channel.

In a second aspect, in addition to one or more of the preceding or following aspects, or in the alternative to some aspects, the method further can include removing the die block from the end of the channel.

In a third aspect, in addition to one or more of the preceding or following aspects, or in the alternative to some aspects, the injection port is defined by the die block.

In a fourth aspect, in addition to one or more of the preceding or following aspects, or in the alternative to some aspects, wherein the injection port is defined by a side wall of the hollow profile.

In a fifth aspect, in addition to one or more of the preceding or following aspects, or in the alternative to some aspects, the method further can include inserting the dam within the channel to a specific depth.

In a sixth aspect, in addition to one or more of the preceding or following aspects, or in the alternative to some aspects, the method further can include inserting the dam within the channel to specific depth through hydraulic pressure simultaneously with injecting the flowable composition.

In a seventh aspect, in addition to one or more of the preceding or following aspects, or in the alternative to some aspects, the dam includes a foam plug.

In an eighth aspect, in addition to one or more of the preceding or following aspects, or in the alternative to some aspects, a perimeter shape of the dam is complementary to an interior shape of the channel.

In a ninth aspect, in addition to one or more of the preceding or following aspects, or in the alternative to some aspects, the die block includes an inside surface and at least one projection disposed on the inside surface.

In a tenth aspect, in addition to one or more of the preceding or following aspects, or in the alternative to some aspects, the projection defines the injection port.

In an eleventh aspect, in addition to one or more of the preceding or following aspects, or in the alternative to some aspects, the method further can include a threaded insert disposed on the projection.

In a twelfth aspect, in addition to one or more of the preceding or following aspects, or in the alternative to some aspects, the dam includes an outside surface and at least one cavity is disposed on the outside surface that is complementary to the at least one projection on the inside surface of the die block.

In a thirteenth aspect, in addition to one or more of the preceding or following aspects, or in the alternative to some aspects, the die block includes an inside surface and a material different than the die block disposed along, on or in the inside surface.

In a fourteenth aspect, in addition to one or more of the preceding or following aspects, or in the alternative to some aspects, the die block includes an inside surface and a non-stick coating or a tape over the inside surface.

In a fifteenth aspect, in addition to one or more of the preceding or following aspects, or in the alternative to some aspects, the die block includes a low surface energy material.

In a sixteenth aspect, in addition to one or more of the preceding or following aspects, or in the alternative to some aspects, the flowable composition includes a polymeric composition.

In a seventeenth aspect, in addition to one or more of the preceding or following aspects, or in the alternative to some aspects, the flowable composition includes a curable composition.

In an eighteenth aspect, in addition to one or more of the preceding or following aspects, or in the alternative to some aspects, the flowable composition includes a thermoplastic composition.

In a nineteenth aspect, in addition to one or more of the preceding or following aspects, or in the alternative to some aspects, the flowable composition includes a composite thermoplastic composition.

In a twentieth aspect, in addition to one or more of the preceding or following aspects, or in the alternative to some aspects, the method further can include allowing the flowable composition to transform into a solid before performing later mechanical modification operations.

In a twenty-first aspect, in addition to one or more of the preceding or following aspects, or in the alternative to some aspects, the method further can include mechanically modifying a portion of the hollow profile including an area with the flowable composition.

In a twenty-second aspect, in addition to one or more of the preceding or following aspects, or in the alternative to some aspects, the method further can include milling a portion of the hollow profile including an area with the flowable composition.

In a twenty-third aspect, in addition to one or more of the preceding or following aspects, or in the alternative to some aspects, the method further can include milling a portion of the hollow profile including an area with the flowable composition to form a flat joining surface.

In a twenty-fourth aspect, in addition to one or more of the preceding or following aspects, or in the alternative to some aspects, the method further can include drilling holes in a portion of the hollow profile including an area with the flowable composition.

In a twenty-fifth aspect, in addition to one or more of the preceding or following aspects, or in the alternative to some aspects, the die block includes an inside surface and defines a cavity along the inside surface.

In a twenty-sixth aspect, in addition to one or more of the preceding or following aspects, or in the alternative to some aspects, the cavity can include a tenon cavity.

In a twenty-seventh aspect, in addition to one or more of the preceding or following aspects, or in the alternative to some aspects, the dam includes a flat front wall.

In a twenty-eighth aspect, in addition to one or more of the preceding or following aspects, or in the alternative to some aspects, the dam includes a front wall with one or more projections or depressions disposed thereon.

In a twenty-ninth aspect, a method of preparing a hollow profile for joining is included, the method including placing a dam within a channel defined by the hollow profile, wherein the dam includes a front wall and a back wall and defines a cavity between the front wall and the back wall, and injecting a flowable composition through an injection port into the cavity of the dam, wherein the injection port is defined by a side wall of the hollow profile or the dam.

In a thirtieth aspect, in addition to one or more of the preceding or following aspects, or in the alternative to some aspects, the injection port is defined by a side wall of the hollow profile.

In a thirty-first aspect, in addition to one or more of the preceding or following aspects, or in the alternative to some aspects, the method further can include inserting the dam within the channel to specific depth.

In a thirty-second aspect, in addition to one or more of the preceding or following aspects, or in the alternative to some aspects, a perimeter shape of the dam is complementary to an interior shape of the channel.

In a thirty-third aspect, in addition to one or more of the preceding or following aspects, or in the alternative to some aspects, the flowable composition includes a polymeric composition.

In a thirty-fourth aspect, in addition to one or more of the preceding or following aspects, or in the alternative to some aspects, the flowable composition includes a curable composition.

In a thirty-fifth aspect, in addition to one or more of the preceding or following aspects, or in the alternative to some aspects, the flowable composition includes a thermoplastic composition.

In a thirty-sixth aspect, in addition to one or more of the preceding or following aspects, or in the alternative to some aspects, the flowable composition includes a composite thermoplastic composition.

In a thirty-seventh aspect, in addition to one or more of the preceding or following aspects, or in the alternative to some aspects, the method further can include allowing the flowable composition to transform into a solid before performing later mechanical modification operations.

In a thirty-eighth aspect, in addition to one or more of the preceding or following aspects, or in the alternative to some aspects, the method further can include mechanically modifying a portion of the hollow profile including an area with the flowable composition.

In a thirty-ninth aspect, in addition to one or more of the preceding or following aspects, or in the alternative to some aspects, the method further can include milling a portion of the hollow profile including an area with the flowable composition.

In a fortieth aspect, in addition to one or more of the preceding or following aspects, or in the alternative to some aspects, the method further can include milling a portion of the hollow profile including an area with the flowable composition to form a flat joining surface.

In a forty-first aspect, in addition to one or more of the preceding or following aspects, or in the alternative to some aspects, the method further can include drilling holes in a portion of the hollow profile including an area with the flowable composition.

In a forty-second aspect, in addition to one or more of the preceding or following aspects, or in the alternative to some aspects, the method further can include placing one or more inserts within the cavity of the dam.

In a forty-third aspect, a method of preparing a hollow profile for joining is included, the method including placing a dam within a channel defined by the hollow profile, fitting a die block over an end of the channel, creating a vacuum within the channel between the dam and the die block, and pulling a flowable composition into the channel between the dam and the die block through a supply port.

In a forty-fourth aspect, in addition to one or more of the preceding or following aspects, or in the alternative to some aspects, the method further can include removing the die block from the end of the channel.

In a forty-fifth aspect, in addition to one or more of the preceding or following aspects, or in the alternative to some aspects, the supply port is defined by the die block.

In a forty-sixth aspect, in addition to one or more of the preceding or following aspects, or in the alternative to some aspects, the supply port is defined by a side wall of the hollow profile.

In a forty-seventh aspect, in addition to one or more of the preceding or following aspects, or in the alternative to some aspects, the dam includes a front wall and a back wall and defines a cavity between the front wall and the back wall and wherein the supply port is disposed along the side wall between the front wall and the back wall.

In a forty-eighth aspect, in addition to one or more of the preceding or following aspects, or in the alternative to some aspects, the method further can include inserting the dam within the channel to specific depth.

In a forty-ninth aspect, in addition to one or more of the preceding or following aspects, or in the alternative to some aspects, the dam includes a foam plug.

In a fiftieth aspect, in addition to one or more of the preceding or following aspects, or in the alternative to some aspects, a perimeter shape of the dam is complementary to an interior shape of the channel.

In a fifty-first aspect, in addition to one or more of the preceding or following aspects, or in the alternative to some aspects, the die block includes an inside surface and at least one projection disposed on the inside surface.

In a fifty-second aspect, in addition to one or more of the preceding or following aspects, or in the alternative to some aspects, the method further can include a threaded insert disposed on the projection.

In a fifty-third aspect, in addition to one or more of the preceding or following aspects, or in the alternative to some aspects, the dam includes an outside surface and at least one cavity is disposed on the outside surface that is complementary to the at least one projection on the inside surface of the die block.

In a fifty-fourth aspect, in addition to one or more of the preceding or following aspects, or in the alternative to some aspects, the die block includes an inside surface and a non-stick coating over the inside surface.

In a fifty-fifth aspect, in addition to one or more of the preceding or following aspects, or in the alternative to some aspects, the flowable composition includes a polymeric composition.

In a fifty-sixth aspect, in addition to one or more of the preceding or following aspects, or in the alternative to some aspects, the flowable composition includes a curable polymeric composition.

In a fifty-seventh aspect, in addition to one or more of the preceding or following aspects, or in the alternative to some aspects, the flowable composition includes a thermoplastic composition.

In a fifty-eighth aspect, in addition to one or more of the preceding or following aspects, or in the alternative to some aspects, the flowable composition includes a composite thermoplastic composition.

In a fifty-ninth aspect, in addition to one or more of the preceding or following aspects, or in the alternative to some aspects, the method further can include allowing the flowable composition to transform into a solid before performing later mechanical modification operations.

In a sixtieth aspect, in addition to one or more of the preceding or following aspects, or in the alternative to some aspects, the method further can include mechanically modifying a portion of the hollow profile including an area with the flowable composition.

In a sixty-first aspect, in addition to one or more of the preceding or following aspects, or in the alternative to some aspects, the method further can include milling a portion of the hollow profile including an area with the flowable composition.

In a sixty-second aspect, in addition to one or more of the preceding or following aspects, or in the alternative to some aspects, the method further can include cross-milling a portion of the hollow profile including an area with the flowable composition.

In a sixty-third aspect, in addition to one or more of the preceding or following aspects, or in the alternative to some aspects, the method further can include drilling holes in a portion of the hollow profile including an area with the flowable composition.

In a sixty-fourth aspect, in addition to one or more of the preceding or following aspects, or in the alternative to some aspects, the die block includes an inside surface and defines a cavity along the inside surface.

In a sixty-fifth aspect, in addition to one or more of the preceding or following aspects, or in the alternative to some aspects, the cavity can include a tenon cavity.

In a sixty-sixth aspect, in addition to one or more of the preceding or following aspects, or in the alternative to some aspects, the dam includes a flat front wall.

In a sixty-seventh aspect, in addition to one or more of the preceding or following aspects, or in the alternative to some aspects, the dam includes a front wall with one or more projections or depressions disposed thereon.

In a sixty-eighth aspect, in addition to one or more of the preceding or following aspects, or in the alternative to some aspects, an aperture to draw air out of the channel and generate a vacuum is disposed on at least one of the dam, the die block, and a side wall of the hollow profile.

In a sixty-ninth aspect, a method of preparing a hollow profile for joining is included, the method including fitting a dam within a channel defined by the hollow profile, positioning the hollow profile vertically with the dam down, and inserting a flowable composition into the channel.

In a seventieth aspect, in addition to one or more of the preceding or following aspects, or in the alternative to some aspects, the flowable composition includes a polymeric composition.

In a seventy-first aspect, in addition to one or more of the preceding or following aspects, or in the alternative to some aspects, the flowable composition includes a curable composition.

In a seventy-second aspect, in addition to one or more of the preceding or following aspects, or in the alternative to some aspects, the flowable composition includes a thermoplastic composition.

In a seventy-third aspect, in addition to one or more of the preceding or following aspects, or in the alternative to some aspects, the flowable composition includes a composite thermoplastic composition.

In a seventy-fourth aspect, in addition to one or more of the preceding or following aspects, or in the alternative to some aspects, the method further can include allowing the flowable composition to transform into a solid before performing later mechanical modification operations.

In a seventy-fifth aspect, in addition to one or more of the preceding or following aspects, or in the alternative to some aspects, the method further can include mechanically modifying a portion of the hollow profile including an area with the flowable composition.

In a seventy-sixth aspect, in addition to one or more of the preceding or following aspects, or in the alternative to some aspects, the method further can include milling a portion of the hollow profile including an area with the flowable composition.

In a seventy-seventh aspect, in addition to one or more of the preceding or following aspects, or in the alternative to some aspects, the method further can include cross-milling a portion of the hollow profile including an area with the flowable composition.

In a seventy-eighth aspect, in addition to one or more of the preceding or following aspects, or in the alternative to some aspects, the method further can include drilling holes in a portion of the hollow profile including an area with the flowable composition.

In a seventy-ninth aspect, a method of preparing a hollow profile for joining is included, the method including fitting a die block over an end of a channel defined by the hollow profile, positioning the hollow profile vertically with the die block down, and inserting a flowable composition into the channel.

In an eightieth aspect, in addition to one or more of the preceding or following aspects, or in the alternative to some aspects, the method further can include removing the die block from the end of the channel.

In an eighty-first aspect, in addition to one or more of the preceding or following aspects, or in the alternative to some aspects, the die block includes an inside surface and at least one projection disposed on the inside surface.

In an eighty-second aspect, in addition to one or more of the preceding or following aspects, or in the alternative to some aspects, the method further can include a threaded insert disposed on the projection.

In an eighty-third aspect, in addition to one or more of the preceding or following aspects, or in the alternative to some aspects, the flowable composition includes a polymeric composition.

In an eighty-fourth aspect, in addition to one or more of the preceding or following aspects, or in the alternative to some aspects, the flowable composition includes a curable composition.

In an eighty-fifth aspect, in addition to one or more of the preceding or following aspects, or in the alternative to some aspects, the flowable composition includes a thermoplastic composition.

In an eighty-sixth aspect, in addition to one or more of the preceding or following aspects, or in the alternative to some aspects, the flowable composition includes a composite thermoplastic composition.

In an eighty-seventh aspect, in addition to one or more of the preceding or following aspects, or in the alternative to some aspects, the method further can include allowing the flowable composition to transform into a solid before performing later mechanical modification operations.

In an eighty-eighth aspect, in addition to one or more of the preceding or following aspects, or in the alternative to some aspects, the method further can include mechanically modifying a portion of the hollow profile including an area with the flowable composition.

In an eighty-ninth aspect, in addition to one or more of the preceding or following aspects, or in the alternative to some aspects, the method further can include milling a portion of the hollow profile including an area with the flowable composition.

In a ninetieth aspect, in addition to one or more of the preceding or following aspects, or in the alternative to some aspects, the method further can include cross-milling a portion of the hollow profile including an area with the flowable composition.

In a ninety-first aspect, in addition to one or more of the preceding or following aspects, or in the alternative to some aspects, the method further can include drilling holes in a portion of the hollow profile including an area with the flowable composition.

In a ninety-second aspect, in addition to one or more of the preceding or following aspects, or in the alternative to some aspects, the die block can include an inside surface and defining a cavity along the inside surface.

In a ninety-third aspect, in addition to one or more of the preceding or following aspects, or in the alternative to some aspects, the cavity can include a tenon cavity.

In a ninety-fourth aspect, a method of preparing a hollow profile for joining is included, the method including forming a solid profile with an outer perimeter shape matching an inner surface of a channel of a hollow profile, applying an adhesive composition to at least one of inner surfaces of the channel and the outer perimeter of the solid profile, inserting the solid profile into the channel of the hollow profile, and cutting the solid profile to a desire length.

In a ninety-fifth aspect, in addition to one or more of the preceding or following aspects, or in the alternative to some aspects, the cutting the solid profile to a desire length occurs prior to the inserting the solid profile into the channel of the hollow profile.

In a ninety-sixth aspect, in addition to one or more of the preceding or following aspects, or in the alternative to some aspects, the cutting the solid profile to a desire length occurs after the inserting the solid profile into the channel of the hollow profile.

In a ninety-seventh aspect, in addition to one or more of the preceding or following aspects, or in the alternative to some aspects, the method further can include inserting the solid profile within the channel to specific depth.

In a ninety-eighth aspect, in addition to one or more of the preceding or following aspects, or in the alternative to some aspects, the method further can include mechanically modifying a portion of the hollow profile including an area with the solid profile.

In a ninety-ninth aspect, in addition to one or more of the preceding or following aspects, or in the alternative to some aspects, the method further can include cross-milling a portion of the hollow profile including an area with the solid profile.

In a one hundred and aspect, in addition to one or more of the preceding or following aspects, or in the alternative to some aspects, the method further can include drilling holes in a portion of the hollow profile including an area with the solid profile.

In a one hundred and first aspect, in addition to one or more of the preceding or following aspects, or in the alternative to some aspects, the operation of applying an adhesive composition is performed before the operation of inserting the solid profile into the channel.

In a one hundred and second aspect, in addition to one or more of the preceding or following aspects, or in the alternative to some aspects, the operation of applying an adhesive composition is performed after the operation of inserting the solid profile into the channel.

In a one hundred and third aspect, a fenestration unit component is included having a hollow profile, the hollow profile can include an internal channel, and a dam, wherein the dam is disposed within the internal channel. The hollow profile can also include a solid filler, wherein the solid filler is disposed within the internal channel between the dam and an end of the hollow profile.

In a one hundred and fourth aspect, in addition to one or more of the preceding or following aspects, or in the alternative to some aspects, the dam can include a foam plug.

In a one hundred and fifth aspect, in addition to one or more of the preceding or following aspects, or in the alternative to some aspects, the solid filler can include a solidified polymeric composition.

In a one hundred and sixth aspect, in addition to one or more of the preceding or following aspects, or in the alternative to some aspects, the solidified polymeric composition can include a cured polymeric composition.

In a one hundred and seventh aspect, in addition to one or more of the preceding or following aspects, or in the alternative to some aspects, the solidified polymeric composition can include a thermoplastic polymer.

In a one hundred and eighth aspect, in addition to one or more of the preceding or following aspects, or in the alternative to some aspects, the solidified polymeric composition can include a composite thermoplastic polymer composition.

In a one hundred and ninth aspect, in addition to one or more of the preceding or following aspects, or in the alternative to some aspects, the dam can include an outside surface, the outside surface can include at least one cavity disposed thereon.

In a one hundred and tenth aspect, in addition to one or more of the preceding or following aspects, or in the alternative to some aspects, the solid filler includes a molded internal feature.

In a one hundred and eleventh aspect, in addition to one or more of the preceding or following aspects, or in the alternative to some aspects, the solid filler includes a molded external feature.

In a one hundred and twelfth aspect, in addition to one or more of the preceding or following aspects, or in the alternative to some aspects, the solid filler can include a molded screw chase.

In a one hundred and thirteenth aspect, in addition to one or more of the preceding or following aspects, or in the alternative to some aspects, the solid filler can include at least one projection, wherein the at least one projection extends beyond an end of the hollow profile.

In a one hundred and fourteenth aspect, in addition to one or more of the preceding or following aspects, or in the alternative to some aspects, the at least one projection can include a tenon.

In a one hundred and fifteenth aspect, in addition to one or more of the preceding or following aspects, or in the alternative to some aspects, the solid filler includes at least one cavity.

In a one hundred and sixteenth aspect, in addition to one or more of the preceding or following aspects, or in the alternative to some aspects, the hollow profile further can include a milled, flat joining surface.

In a one hundred and seventeenth aspect, in addition to one or more of the preceding or following aspects, or in the alternative to some aspects, a portion of the milled, flat joining surface is planar, and wherein a portion of the milled, flat joining surface extends across a portion of the solid filler.

In a one hundred and eighteenth aspect, a method of preparing a first member for joining to a second member is included, wherein the first member includes a hollow portion, the method including defining a volume within the first member using at least one flow control device, filling the defined volume with a flowable polymeric composition, allowing the flowable polymeric composition to solidify to form a solid portion in the first member, and mechanically modifying the solid portion to define a joining surface suitable for joining to the second member.

In a one hundred and nineteenth aspect, in addition to one or more of the preceding or following aspects, or in the alternative to some aspects, the method further can include joining the first member to the second member.

In a one hundred and twentieth aspect, in addition to one or more of the preceding or following aspects, or in the alternative to some aspects, wherein joining the first member to the second member further includes inserting mechanical fasteners.

In a one hundred and twenty-first aspect, in addition to one or more of the preceding or following aspects, or in the alternative to some aspects, wherein joining the first member to the second member further includes inserting threaded mechanical fasteners.

In a one hundred and twenty-second aspect, in addition to one or more of the preceding or following aspects, or in the alternative to some aspects, the method further can include adding a sealing layer between the first member and the second member.

In a one hundred and twenty-third aspect, in addition to one or more of the preceding or following aspects, or in the alternative to some aspects, wherein the sealing layer includes a gasket.

In a one hundred and twenty-fourth aspect, in addition to one or more of the preceding or following aspects, or in the alternative to some aspects, wherein filling the defined volume with a flowable polymeric composition further includes pressure injection of the flowable polymeric composition.

In a one hundred and twenty-fifth aspect, in addition to one or more of the preceding or following aspects, or in the alternative to some aspects, wherein a position of the at least one flow control device is determined by a quantity of the flowable polymeric material injected.

In a one hundred and twenty-sixth aspect, in addition to one or more of the preceding or following aspects, or in the alternative to some aspects, wherein the at least one flow control device includes a mold feature for producing a molded-in feature in the solid portion.

In a one hundred and twenty-seventh aspect, in addition to one or more of the preceding or following aspects, or in the alternative to some aspects, wherein the at least one flow control device defines an external surface of the solid portion.

In a one hundred and twenty-eighth aspect, in addition to one or more of the preceding or following aspects, or in the alternative to some aspects, wherein the at least one flow control device defines an injection port.

In a one hundred and twenty-ninth aspect, in addition to one or more of the preceding or following aspects, or in the alternative to some aspects, wherein the solidification of the flowable polymeric composition includes a chemical reaction.

In a one hundred and thirtieth aspect, in addition to one or more of the preceding or following aspects, or in the alternative to some aspects, wherein the flowable composition includes at least one an additive selected from the group consisting of inorganic particulates, organic particulates, inorganic fibers, organic fibers, impact modifiers, and adhesion promoters.

In a one hundred and thirty-first aspect, in addition to one or more of the preceding or following aspects, or in the alternative to some aspects, wherein the flowable polymeric composition includes a thermoplastic material.

In a one hundred and thirty-second aspect, in addition to one or more of the preceding or following aspects, or in the alternative to some aspects, the method further can include providing an injection port in the first member.

In a one hundred and thirty-third aspect, in addition to one or more of the preceding or following aspects, or in the alternative to some aspects, wherein the first member includes an extrusion or pultrusion.

In a one hundred and thirty-fourth aspect, in addition to one or more of the preceding or following aspects, or in the alternative to some aspects, wherein at least one of the flow control devices includes a foam block.

In a one hundred and thirty-fifth aspect, in addition to one or more of the preceding or following aspects, or in the alternative to some aspects, wherein the flowable composition adheres to the first member.

In a one hundred and thirty-sixth aspect, in addition to one or more of the preceding or following aspects, or in the alternative to some aspects, wherein the at least one flow control device includes a non-adhesive surface configured to contact the flowable polymeric composition.

In a one hundred and thirty-seventh aspect, in addition to one or more of the preceding or following aspects, or in the alternative to some aspects, wherein mechanical modification includes at least one of milling and cutting.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, hollow profiles (formed through extrusion, pultrusion, etc.) present challenges for joining mating components together as they are not solid, do not provide anchoring for fasteners in many locations, and can have non-planar and/or discontinuous surfaces depending on the hollow profile design.

However, in accordance with embodiments herein, portions of hollow profiles can be selectively filled with a material in order to make mating and joining operations much more like such operations for solid profiles. As such, in accordance with embodiments herein, the ease of solid profile joining can be enjoyed while using hollow profiles without excess material waste.

The term joining, as used herein, shall include reference to joining any given component of a fenestration unit to another component of a fenestration unit whether structural, decorative, hardware, or the like. As such, joining shall include attaching one profile or profile assembly to another, such as at an end to form the corner of a frame or at a midpoint of a profile to form a "T" intersection. Joining shall also explicitly include attaching a hardware component, such as a hinge or a handle or the like to a profile or profile assembly.

As merely one example, a method of preparing a hollow profile for joining included herein can include an operation of placing a dam within a channel defined by the hollow profile. The method can also include operations of fitting a die block over an end of the channel and then injecting a flowable composition through an injection port into the channel. The method can also include letting the flowable composition form a solid portion, removing the die block, and then mechanically modifying (such as milling or cutting) the hollow profile including some portion of the solid portion.

Figure 1:
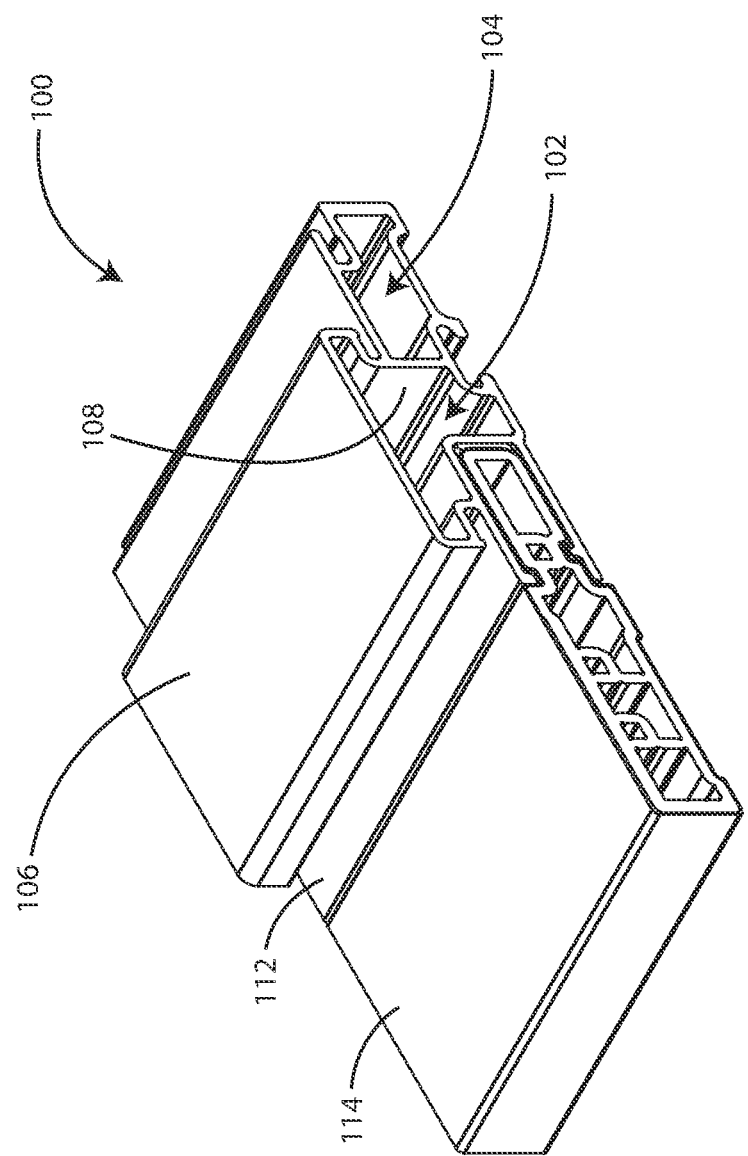
FIG. 1 is a perspective view of a hollow profile assembly in accordance with various embodiments herein.

Referring now to FIG. 1, a perspective view of a hollow profile assembly 100 is shown in accordance with various embodiments herein. The hollow profile assembly includes a first hollow profile 112 and a second hollow profile 114. The first hollow profile 112 includes a first internal channel 102. In this example, the first hollow profile 112 also includes a second internal channel 104. The first hollow profile 112 also includes a side wall 106. The side wall 106 can at least partially define the internal channels. The internal channel 102 includes an internal surface 108.

In some embodiments, the internal surface 108 can simply be the result of an extrusion or pultrusion process. However, in some embodiments the internal surface 108 can be prepared by application of a primer, through chemical modification, through mechanical roughening, or through other processing steps so as to promote adhesion with a flowable composition that is later inserted as described in greater detail below.

The hollow profiles 112, 114 can be formed of many different materials and by using various processes. In some embodiments, the hollow profiles 112, 114 can be formed using an extrusion or pultrusion process. In some embodiments, the hollow profiles 112, 114 can include a polymer, a metal, and/or a composite. In various embodiments, polymers of the hollow profiles 112, 114 can include or be a durable polymer. In various embodiments, polymers of the hollow profiles can include or be a thermoplastic polymer. In various embodiments, polymers of the hollow profiles can include a reaction-injection molding polymer such as a reaction-injection molding urethane polymer. In various embodiments, the polymer of the hollow profiles can include or be a homopolymer, a copolymer, a polymer alloy, or a crosslinked polymer. In various embodiments, the polymer can include or be a polyvinylchloride or a polylactic acid. In various embodiments, the hollow profiles can include or be an extruded composite, a pultruded composite or a fiber-reinforced composite. Various particulates (organic or inorganic) and/or fibers (organic or inorganic) can be disposed within the material of the hollow profiles.

Exemplary materials for the hollow profiles are described in U.S. Pat. Nos. 5,205,102; 5,406,768; 5,441,801; 5,486,553; 5,497,594; 5,518,677; 5,539,027; 5,695,874; 5,773,138; 5,827,607; 5,827,607; 5,882,564; 5,932,334; 5,948,524; 5,981,067; 5,985,429; 6,004,668; 6,015,611; 6,015,612; 6,054,207; 6,122,877; 6,210,792; 6,265,037; 6,280,667; 6,346,160; 6,346,160; 6,357,197; and 10,550,257; and in Publ. Appl. No. 2017/0240738, the content of all of which are herein incorporated by reference.

Figure 2:
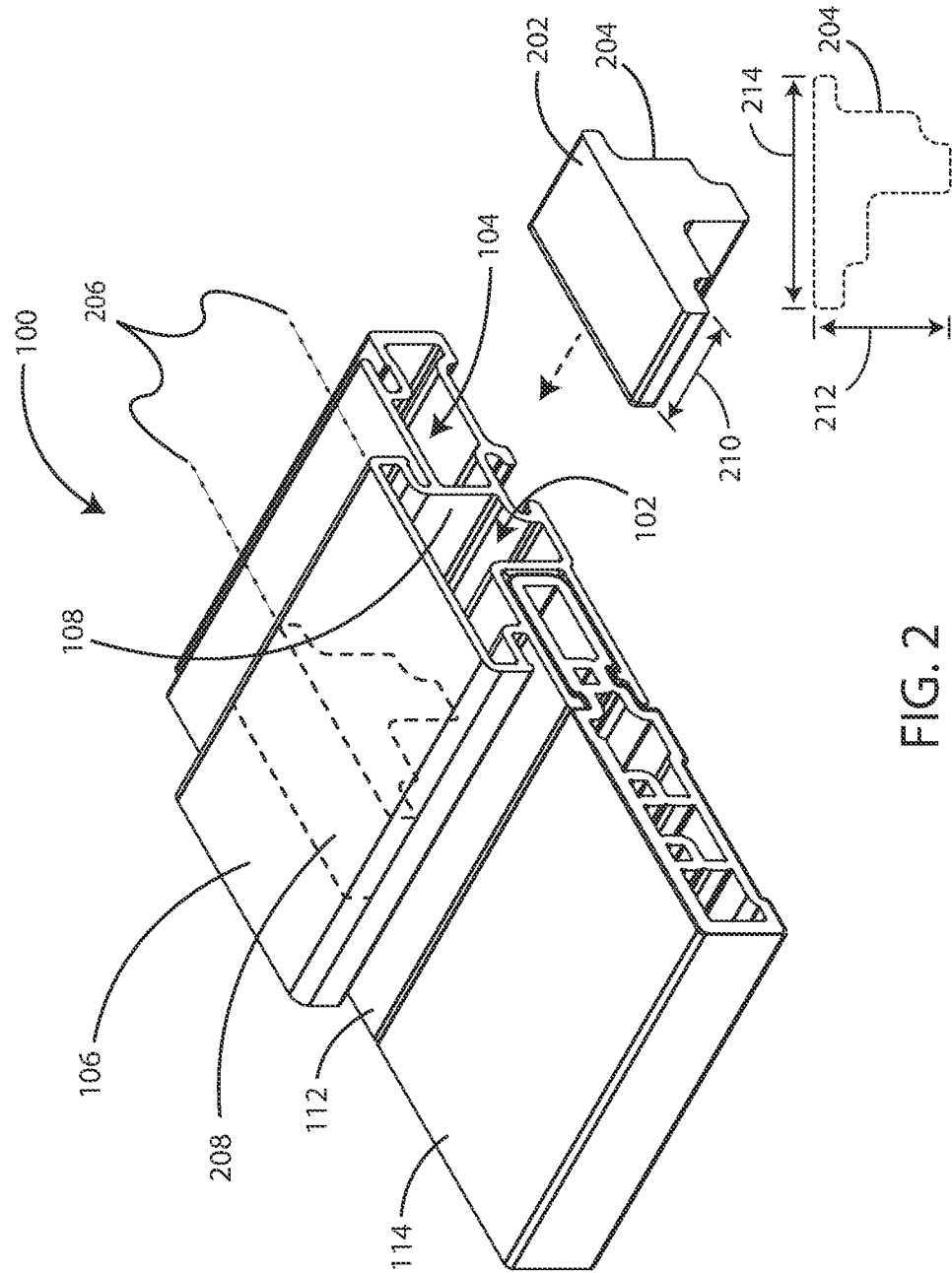
FIG. 2 is a perspective view of a hollow profile assembly in accordance with various embodiments herein.

Referring now to FIG. 2, a perspective view of a hollow profile assembly 100 is shown in accordance with various embodiments herein including a first hollow profile 112 and a second hollow profile 114. As before, the first hollow profile 112 includes a first internal channel 102, a second internal channel 104, and a side wall 106. The internal channel 102 includes an internal surface 108.

In this view, a dam 202 is also shown. The dam 202 can serve as one example of a flow control device herein. In various embodiments, the dam 202 can be disposed within the internal channel 102. The dam 202 can serve to block the flow of a flowable composition when the flowable composition is injected or otherwise inserted into the channel 102 of the hollow profile. Thus, the dam 202 can serve as a back stop for the flowable composition.

A dam position 208 is indicated in this view. The dam position 208 begins at a particular depth 206 from the end of the first hollow profile 112. The dam position 208 can reflect where the dam 202 will be positioned.

The depth 206 can be of various lengths. In some embodiments, the depth 206 can be greater than or equal to 1 cm, 3 cm, 6 cm, 8 cm, or 10 cm. In some embodiments, the depth 206 can be less than or equal to 30 cm, 25 cm, 20 cm, 15 cm, or 10 cm. In some embodiments, the depth 206 can fall within a range of 1 cm to 30 cm, or 3 cm to 25 cm, or 6 cm to 20 cm, or 8 cm to 15 cm, or can be about 10 cm.

The dam 202 includes a perimeter shape 204. In various embodiments, the perimeter shape 204 of the dam 202 can be complementary in shape to an interior shape of the channel such that it fits tightly against the interior of the channel and can effectively stop the flow of a composition therein. In some embodiments, the dam 202 can fit against the interior of the channel with some gaps that are big enough to let out air, but not big enough to let out the flowable composition at any significant rate. In some embodiments, the dam 202 can include one or more vent holes therein to let out air. In some embodiments the perimeter shape 204 of the dam 202 can be complementary in shape to an interior shape of the channel 102, but slightly larger. In some embodiments the perimeter shape 204 of the dam 202 can be complementary in shape to an interior shape of the channel 102, but slightly smaller. In some embodiments the perimeter shape 204 of the dam 202 can be complementary in shape and the same size as an interior shape of the channel 102.

The dam 202 can have a height 212, a width 214 and a depth 210. If the depth 210 is too small relative to the height 212 or the width 214, then it may be possible for the dam 202 to rotate or twist inside the channel 102 as the dam 202 gets into the channel 102. However, rotating or twisting of the dam 202 could lead to it not effectively blocking the flow of a flowable composition. In some embodiments herein, the depth 210 is at least about 0.25, 0.5, 0.75, 1, 1.25, 1.5 or 2 times the size of the smallest dimension of the dam 202 as selected between the width 214 and the height 212, or an amount falling within a range between any of the foregoing.

In various embodiments, embodiments herein can include inserting the dam 202 within the channel to the dam position 208, such that the outside of the dam 202 is at specific depth 206 with respect to the end of the channel 102. Thus, the dam 202 (as an example of a flow control device) can serve to at least partially define a volume within the first member. In some embodiments, the dam 202 can be physically pushed into position manually (with a tool or not) or automatically. As will be seen below, in some embodiments the dam 202 can be pushed into position using hydraulic pressure.

In some cases, the dam 202 can be held in place with a friction-fit type mechanism. In some embodiments, a component such as a spring tab or clip can be used to hold the dam 202 in place.

The dam 202 can be formed of many different materials. In some embodiments, the dam 202 can include on a polymer, a metal, a glass, a ceramic, a composite, or a cellulosic material (or multiple materials selected from any of the preceding). In some embodiments, the dam 202 can be formed of a compressible material. In other embodiments, the dam 202 can be substantially incompressible. In some embodiments, the dam 202 can be porous and in other embodiments the dam 202 can be substantially non-porous.

In some embodiments, the dam 202 can be porous to the flow of air, but not a flowable composition herein. In various embodiments, the dam 202 can include a foam. In various embodiments, the dam 202 can include a foam plug.

A flowable composition can be injected or otherwise inserted into the end of the profile. In specific, a flowable material can be injected or otherwise inserted into the profile in the channel 102 between the dam 202 and the end of the channel 102. Further details regarding the nature of the flowable material are described in greater detail below. Various amounts of the flowable material can be used. In some embodiments, the volume of the flowable material can be greater than or equal to 5 mL, 10 mL, 250 mL, 500 mL, 75 mL, or 1000 mL. In some embodiments, the volume can be less than or equal to 3000 mL, 2500 mL, 2000 mL, 1500 mL, or 1000 mL. In some embodiments, the volume can fall within a range between any of the preceding such as 5 mL to 3000 mL, or 250 mL to 2500 mL, or 500 mL to 2000 mL, or 750 mL to 1500 mL.

Figure 3:
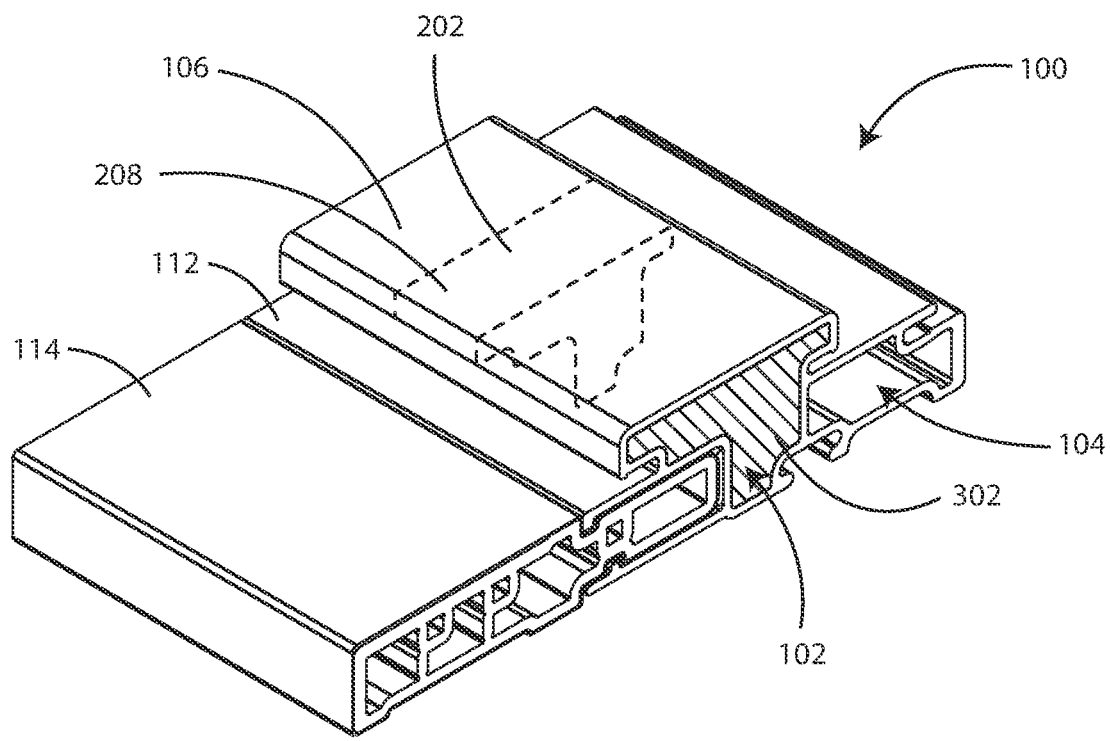
FIG. 3 is a perspective view of a hollow profile assembly in accordance with various embodiments herein.

Referring now to FIG. 3, a perspective view of a hollow profile assembly 100 is shown in accordance with various embodiments herein. The hollow profile assembly 100 includes a first hollow profile 112 and a second hollow profile 114. As before, the first hollow profile 112 includes a first internal channel 102, a second internal channel 104, and a side wall 106. The first internal channel 102 includes a dam position 208 and a dam 202 in inserted into the first internal channel 102 to the dam position 208. The fenestration unit component also includes a solid portion 302 (or solid filler) that is filling the space between the dam 202 and the end of the first internal channel 102 (and end of the hollow profile assembly 100). Effectively then, the internal channel space between the dam 202 and the end of the first internal channel 102 can act like a solid profile for purposes of mating and joining operations. In various embodiments herein, the solid portion 302 can start off as a flowable composition. Exemplary materials that can serve as the solid portion/flowable composition are described in greater detail below.

Figure 4:
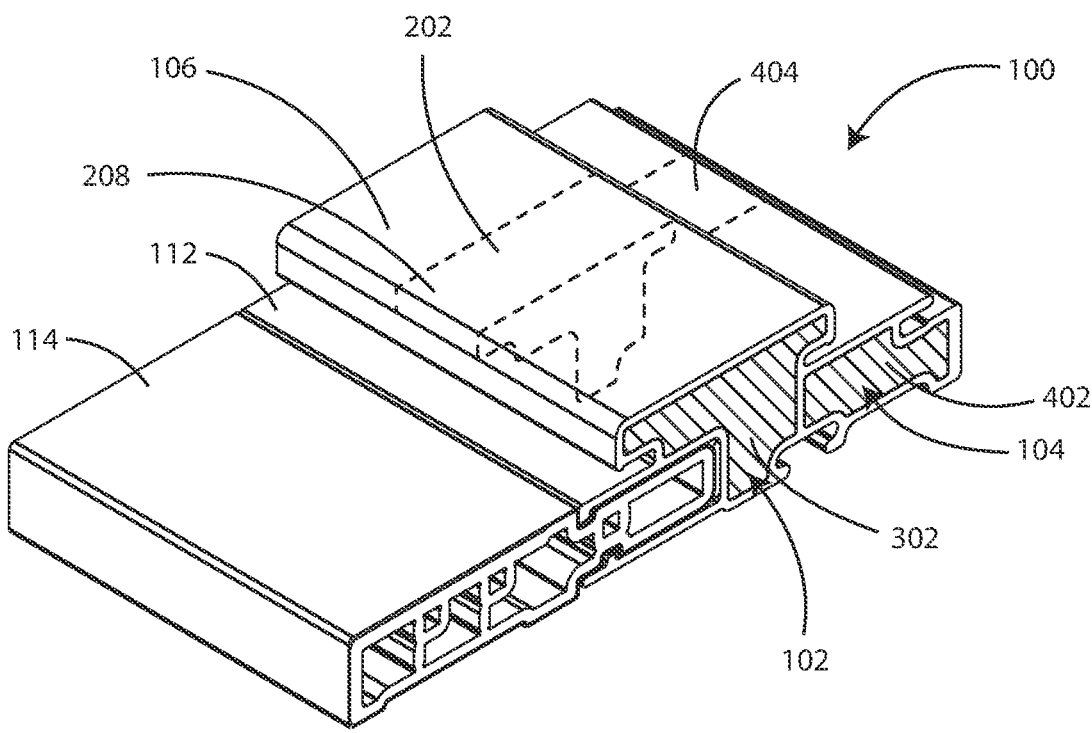
FIG. 4 is a perspective view of a hollow profile assembly in accordance with various embodiments herein.

It will be appreciated that multiple channels of the hollow profile can be filled in accordance with embodiments herein. Referring now to FIG. 4, a perspective view of a hollow profile assembly 100 is shown in accordance with various embodiments herein. The hollow profile assembly 100 can include a first hollow profile 112 and a second hollow profile 114. As before, the first hollow profile 112 includes a first internal channel 102, a second internal channel 104, and a side wall 106. The first internal channel 102 includes a dam position 208 and a dam 202 in inserted into the first internal channel 102 to the dam position 208. The fenestration unit component also includes a solid portion 302 that is filling the space between the dam 202 and the end of the first internal channel 102 (and end of the first hollow profile 112). The fenestration unit component also includes a second solid portion 402 that is filling the space between a second dam 404 and the end of the second internal channel 104 (and end of the first hollow profile 112).

The selectively filled hollow profile can then be subjected to various operations as a part of mating and/or joining procedures. For example, the selectively filled hollow profile can be subjected to various mechanical modification operations. In some cases, the selectively filled hollow profile can be subjected to milling operations to create substantially planar continuous surfaces that can serve as useful points of mating between components. In some cases, the selectively filled hollow profile can be subjected to a cutting and/or drilling operation in order to size the hollow profile and/or to facilitate joining of the hollow profile with another component.

Figure 5:
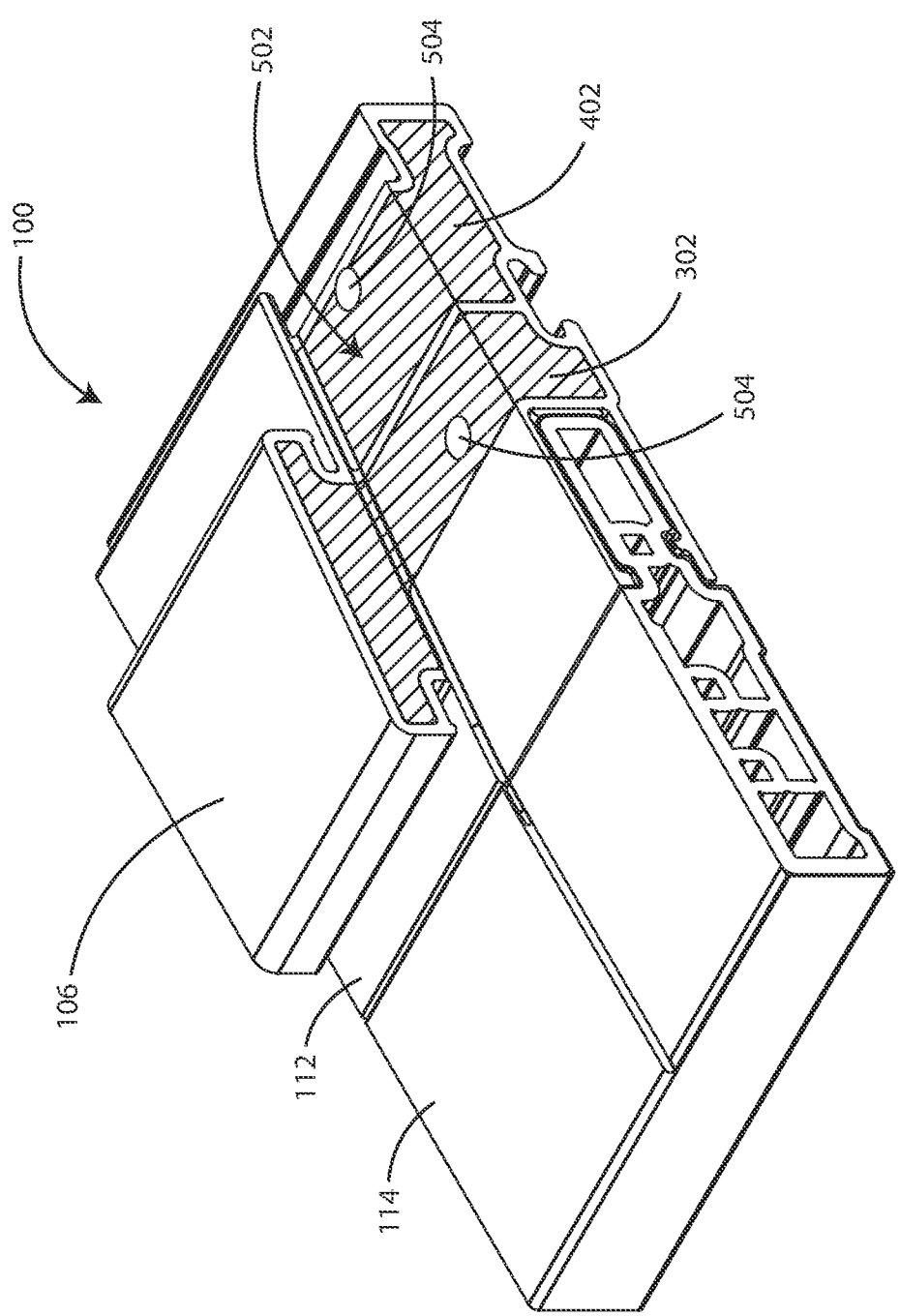
FIG. 5 is a perspective view of a hollow profile assembly in accordance with various embodiments herein.

Referring now to FIG. 5, a perspective view of a hollow profile assembly 100 is shown in accordance with various embodiments herein including a first hollow profile 112 and a second hollow profile 114. The first hollow profile 112 includes a side wall 106. The fenestration unit component also includes a first solid portion 302 and a second solid portion 402. In this example, the first and second hollow profiles 112, 114 have been milled to form a milled, flat joining surface 502. In this example, a hole 504 has also been formed (i.e., drilled) in the milled, flat joining surface 502 which could serve to receive a portion of a fastener, an alignment post or a peg, or another component.

In various embodiments, at least a portion of the milled, flat joining surface 502 is planar. In various embodiments, at least a portion of the milled, flat joining surface 502 extends across a portion of the first solid portion 302.

In various embodiments, embodiments can include allowing a flowable composition to transform into a solid (solid portion) before performing later milling operations. The flowable composition can transform into a solid in various ways. In some embodiments, a chemical reaction such as crosslinking, polymerization, chain extension, or the like can take place to transform the flowable composition into a solid. In some embodiments, the flowable composition can cool down in order to transform into a solid.

Figure 6:
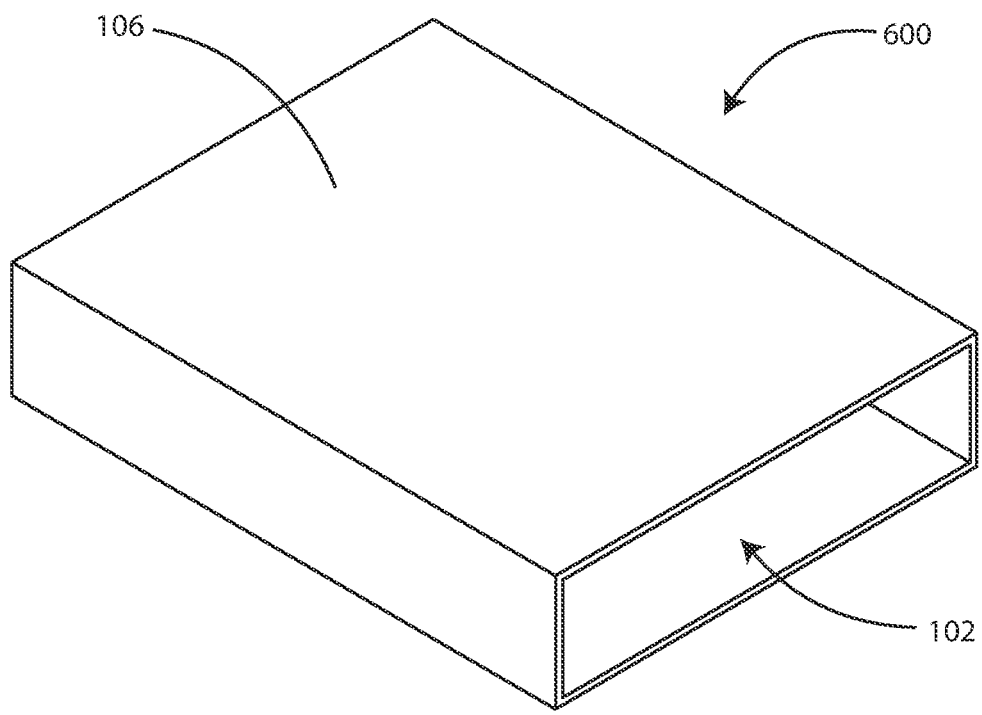
FIG. 6 is a perspective view of a hollow profile in accordance with various embodiments herein.
Figure 7:
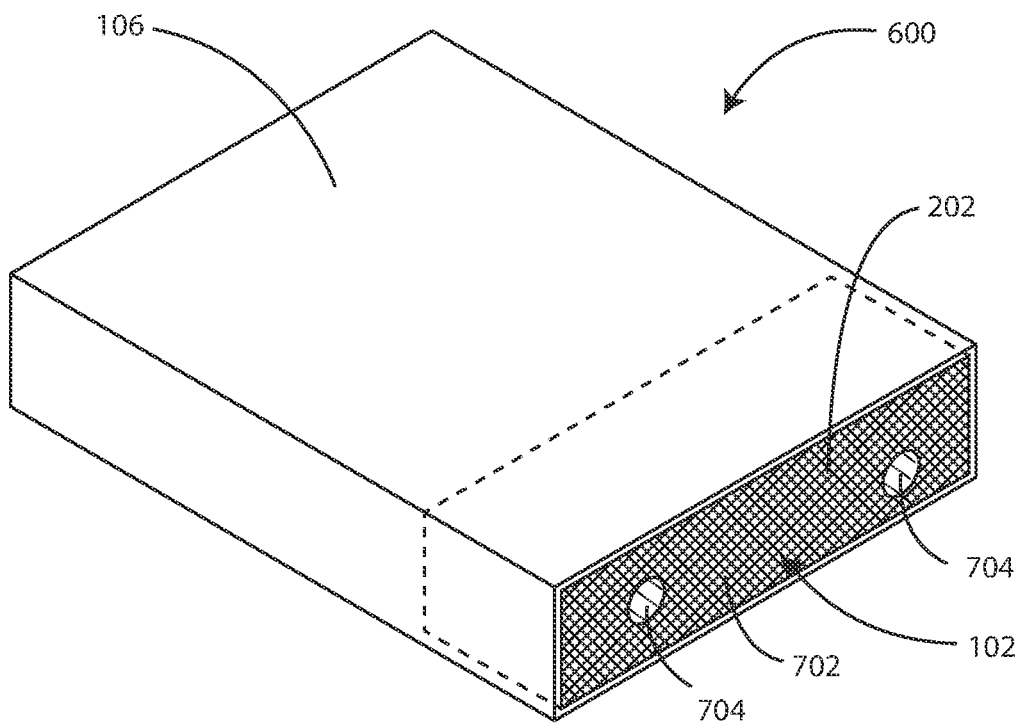
FIG. 7 is a perspective view of a hollow profile in accordance with various embodiments herein.

Hollow profiles herein can take on many different shapes. Referring now to FIG. 6, a perspective view of simple hollow profile 600 is shown in accordance with various embodiments herein. The hollow profile 600 includes an internal channel 102 and a side wall 106 that surrounds the internal channel 102. A dam can be placed into the internal channel. Referring now to FIG. 7, a perspective view of hollow profile 600 is shown in accordance with various embodiments herein. In this view, a dam 202 has been inserted into the internal channel 102. In this example, the dam 202 includes an outside surface 702 and the outside surface 702 defines a dam cavity 704. In various embodiments, the outside surface 702 can also include one or more projections thereon. However, the outside surface 702 can also be flat and substantially featureless in some embodiments.

In various embodiments, the dam cavity 704 can be complementary to various other features. For example, the dam cavity 704 or cavities can be complementary in shape to at least one projection (described further below) on the inside surface of a die block (described further below).

In various embodiments herein, a die block can be fitted to the end of the internal channel(s) of the hollow profile, thereby creating or otherwise defining an enclosed area or volume in combination with the dam and the hollow profiles side wall(s) into which the flowable composition can be injected or otherwise deposited.

Figure 8:
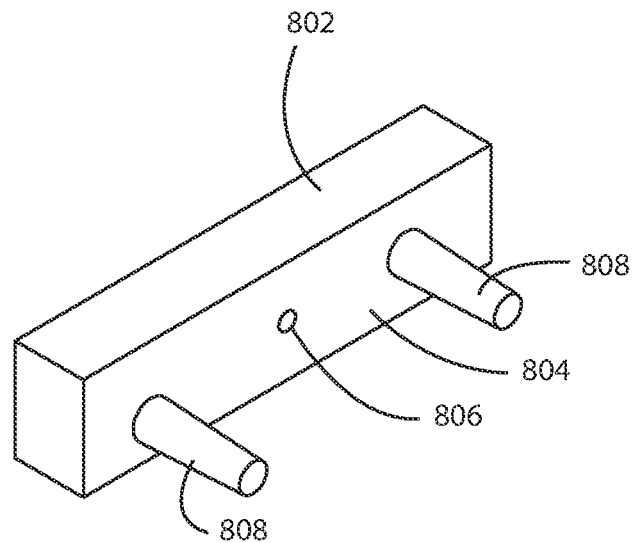
FIG. 8 is a perspective view of a die block in accordance with various embodiments herein.

Referring now to FIG. 8, a perspective view of a die block 802 is shown in accordance with various embodiments herein. The die block 802 can serve as another example of a flow control device herein. The die block 802 includes an inside surface 804. The die block 802 also includes and/or defines an injection port 806 through which a flowable composition can be injected. In this embodiment, the inside surface 804 of the die block 802 also includes a projection 808. However, in some embodiments, the inside surface 804 of the die block 802 can include one or more cavities or depressions therein. In some embodiments, the inside surface 804 of the die block can be substantially flat and featureless.

Projections herein, such as may be present on the die block (in the case of projections 808 shown in FIG. 8) or on the dam (or even both) can serve various purposes. In some scenarios, such as with a projection on a die block, they can be used to form a void in the solid portion that is formed (e.g., with a void being left in the solid portion after the die block carrying the projection is removed). Such a void could be formed for the purpose of accommodating the insertion of some device (such as a screw or bolt). Such a void could also be formed for the purpose of reducing the amount of the flowable composition used to make the resulting structure more cost efficient. Such a void could also be formed for the purpose of forming an air pocket for cooling purposes or for providing an area for material expansion. Similarly, projections on the dam (such as those projecting into the area to be filled with the flowable composition) can be used for various purposes including reducing the amount of the flowable composition used amongst others. The projections can take on many different shapes and, ultimately, can include any three-dimensional shape that projects off of the rest of the die block or dam.

The use of an injection port 806 can result in a sprue on the surface of the solid portion formed when the flowable composition solidifies. However, the sprue, if located in an undesirable place can simply be cut off or otherwise removed during a milling operation herein.

In various embodiments herein, at some point (such as after the flowable composition has solidified) the die block 802 is removed from the end of the profile extrusion. In some embodiments, the die block 802 can include features to allow removal/release from the end of the profile easier. In some embodiments, the die block can include a material that is different than the rest of the die block 802 disposed along, on, or in the inside surface 804 in order to make removal/release easier. In some embodiments, the die block 802 can include a non-stick coating or a tape that is disposed over the inside surface 804.

The die block 802 can be formed of many different materials. In some embodiments, the die block 802 can be formed of a low surface energy material in order to reduce adhesion with the flowable composition and make removal of the die block 802 from the end of the profile easier. In some embodiments, the die block 802 can include a polymer, a metal, a ceramic, or a composite. In various embodiments, a die block polymer can include or be a hydrophobic polymer. In various embodiments, the die block polymer can include or be a polyolefin or a polytetrafluoroethylene. In various embodiments, the polyolefin can include or be a polypropylene or a polyethylene.

Figure 9:
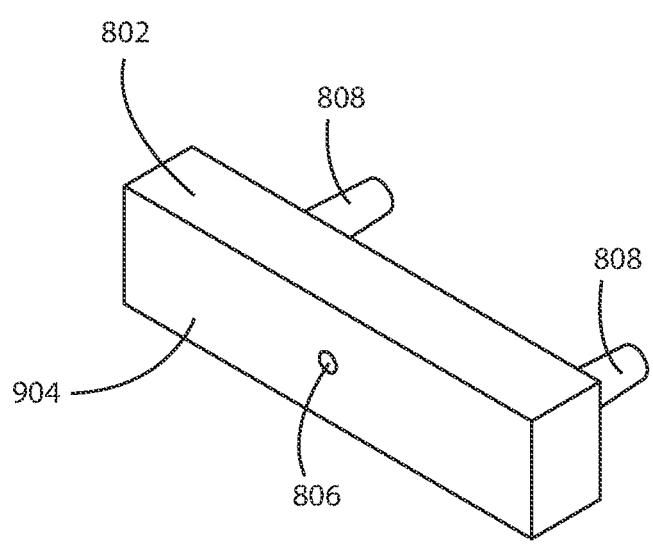
FIG. 9 is a perspective view of a die block in accordance with various embodiments herein.

Referring now to FIG. 9, a perspective view of the die block 802 is shown from a different direction in accordance with various embodiments herein. The die block 802 includes an injection port 806. The die block 802 also includes a projection 808. The die block 802 also includes an outside surface 904. In some embodiments, the outside surface 904 can include features to allow it to be gripped more firmly in order to aid in operations such as removal of the die block 802 from the end of the hollow profile.

In some embodiments, the dam can be inserted within a channel of the hollow profile to a specific depth by pushing it into place and thereafter a flowable composition can be injected or otherwise inserted. However, in some embodiments, the hydraulic pressure generated by injecting or otherwise inserting the flowable composition can be used to push the dam away from the die block 802 and further into the channel into position. Thus, the ultimate position of the dam can be controlled by delivering a specific amount (or predetermined amount or metered amount) of flowable composition into the channel of the hollow profile.

Figure 10:
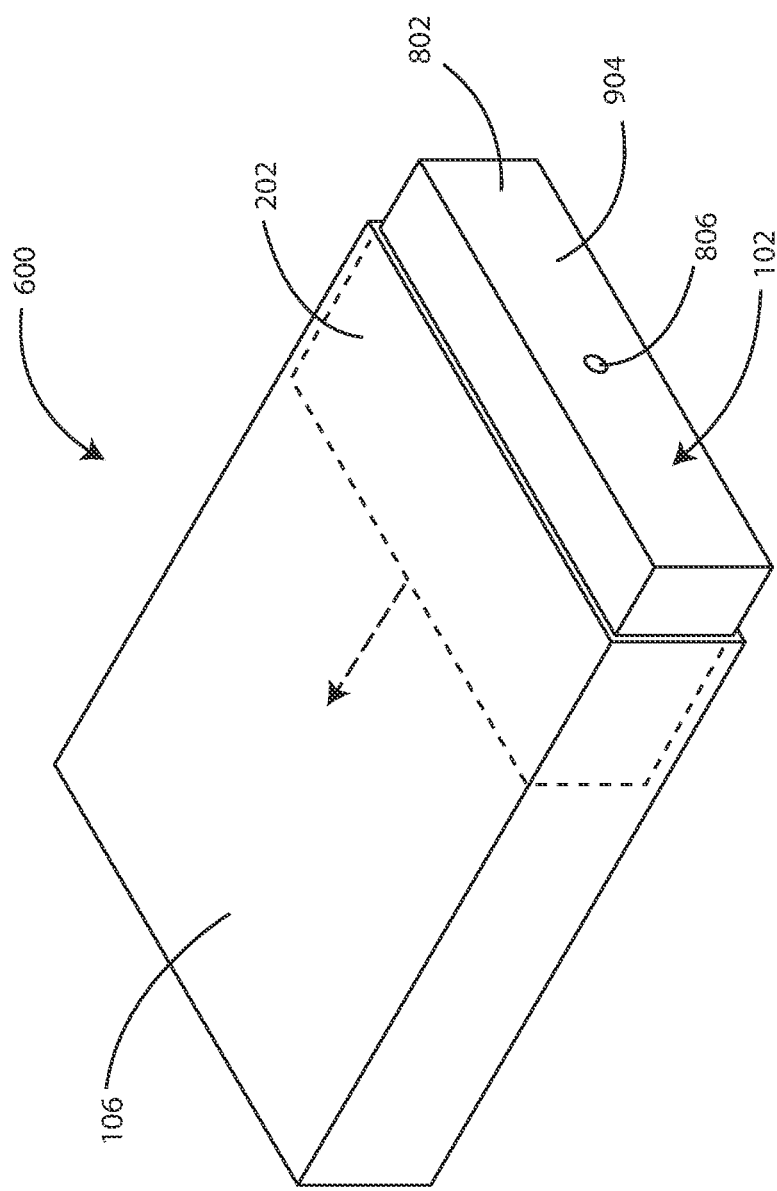
FIG. 10 is a perspective view of a hollow profile fitted with a die block in accordance with various embodiments herein.
Figure 11:
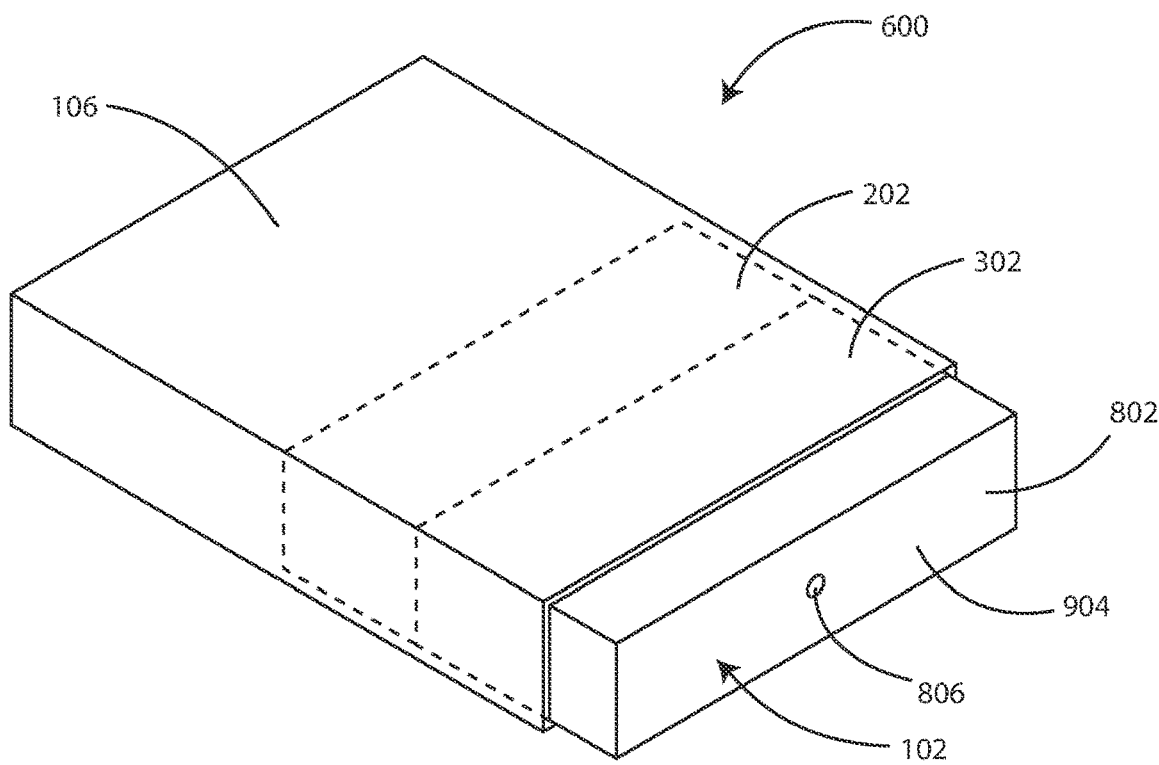
FIG. 11 is a perspective view of a hollow profile fitted with a die block in accordance with various embodiments herein.

Referring now to FIG. 10, a perspective view of hollow profile 600 is shown as fitted with a die block 802 in accordance with various embodiments herein. The die block 802 also includes an outside surface 904 and an injection port 806. A fenestration unit component (not shown in this view) includes a hollow profile 600. The hollow profile 600 includes an internal channel (not shown in this view). The hollow profile 600 also includes a side wall 106. The fenestration unit component also includes a dam 202. In various embodiments, the dam 202 can be inserted within the channel to specific depth through hydraulic pressure simultaneously with injecting the flowable composition. FIG. 11 shows a perspective view of the hollow profile 600 after the dam 202 has been pushed into the hollow profile 600 under hydraulic pressure from injection of the flowable composition. In specific, FIG. 11 shows the hollow profile including the dam 202, the die block 802, and the flowable composition (later to be the solid portion 302) disposed there between.

Figure 12:
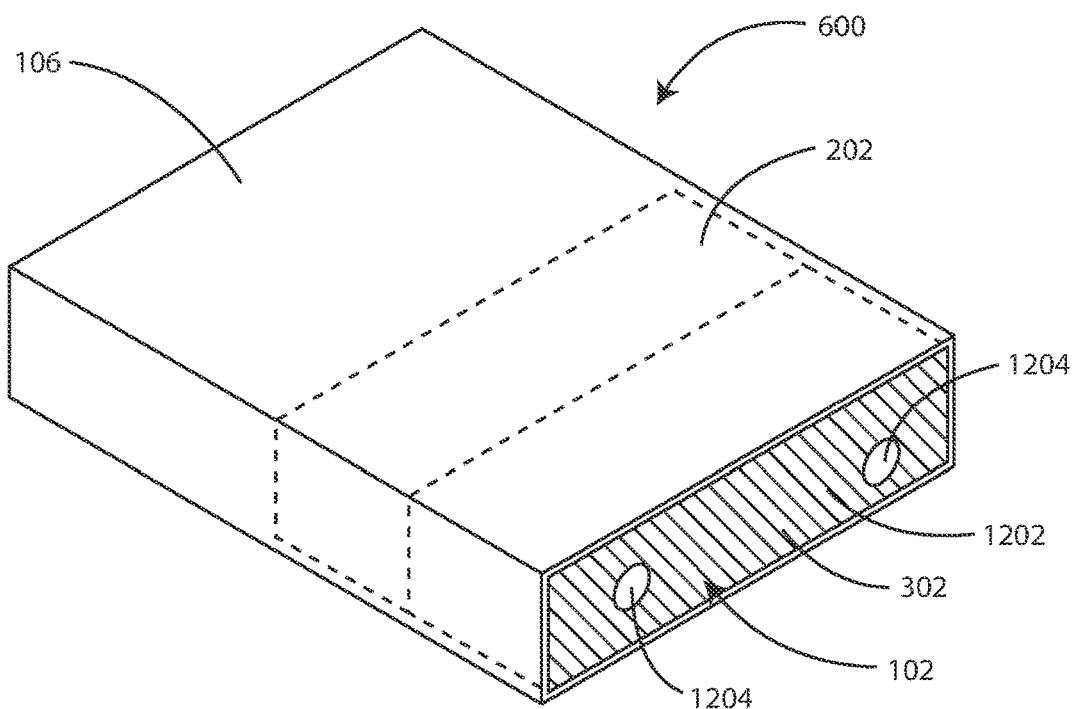
FIG. 12 is a perspective view of a hollow profile in accordance with various embodiments herein.

Referring now to FIG. 12, a perspective view of the hollow profile 600 is shown depicting the hollow profile 600 after the flowable composition has been injected and then solidified and after the die block has been removed. The hollow profile 600 includes a side wall 106 and an internal channel 102 that has a dam 202 inserted therein and has been filled with the solid portion 302. The solid portion 302 includes an outside surface 1202 that has cavities 1204 therein that were formed as a result of the projections 808 on the die block 802 as shown in FIGS. 8-9. As such, the cavities 1204 have been molded-in and did not require a separate milling operation to be formed. It will be appreciated that through similar techniques, the solid portion 302 can included molded internal features of various types (cavities, depressions, slots, holes, screw chases, mortises, and the like), molded external features of various types (projections, tenons, extensions, dowels, pegs, locating pins, and the like) and combinations thereof.

In some embodiments, separate objects can be molded into the end of the hollow profile using operations/techniques herein. For example, in some embodiments, a threaded insert, a threaded stud, a locating pin, or other hardware items can be molded into the end of the hollow profile.

Figure 13:
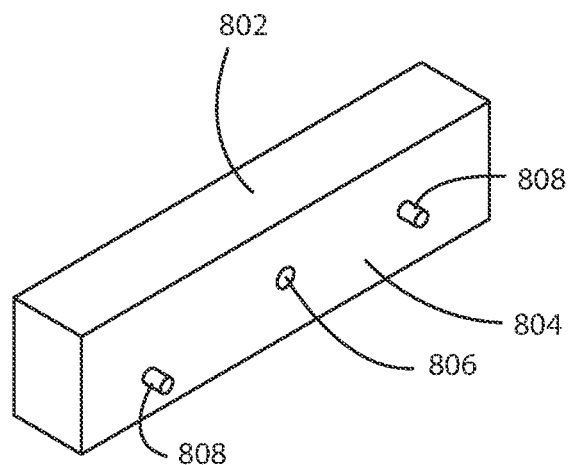
FIG. 13 is a perspective view of a die block in accordance with various embodiments herein.
Figure 14:
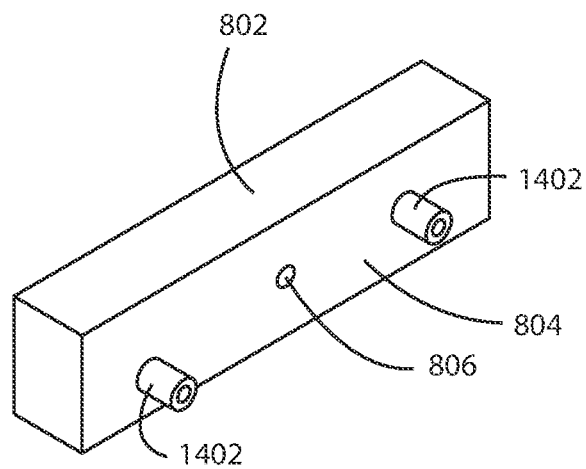
FIG. 14 is a perspective view of a die block in accordance with various embodiments herein.

Referring now to FIG. 13, a perspective view of a die block 802 is shown in accordance with various embodiments herein. The die block 802 includes a die inside surface 804. The die block 802 also defines an injection port 806. The die block 802 also includes projections 808. The projections 808 can be used to hold inserts of various types to be molded into the end of the hollow profile. For example, referring now to FIG. 14, a perspective view of the die block 802 is shown in accordance with various embodiments herein. In this view, threaded inserts 1402 are fitted onto the projection 808.

The threaded insert 1402 (or other molded in hardware) can be formed of many different materials. In some embodiments, the threaded insert 1402 can include a polymer, a metal, a ceramic, or a composite.

Figure 15:
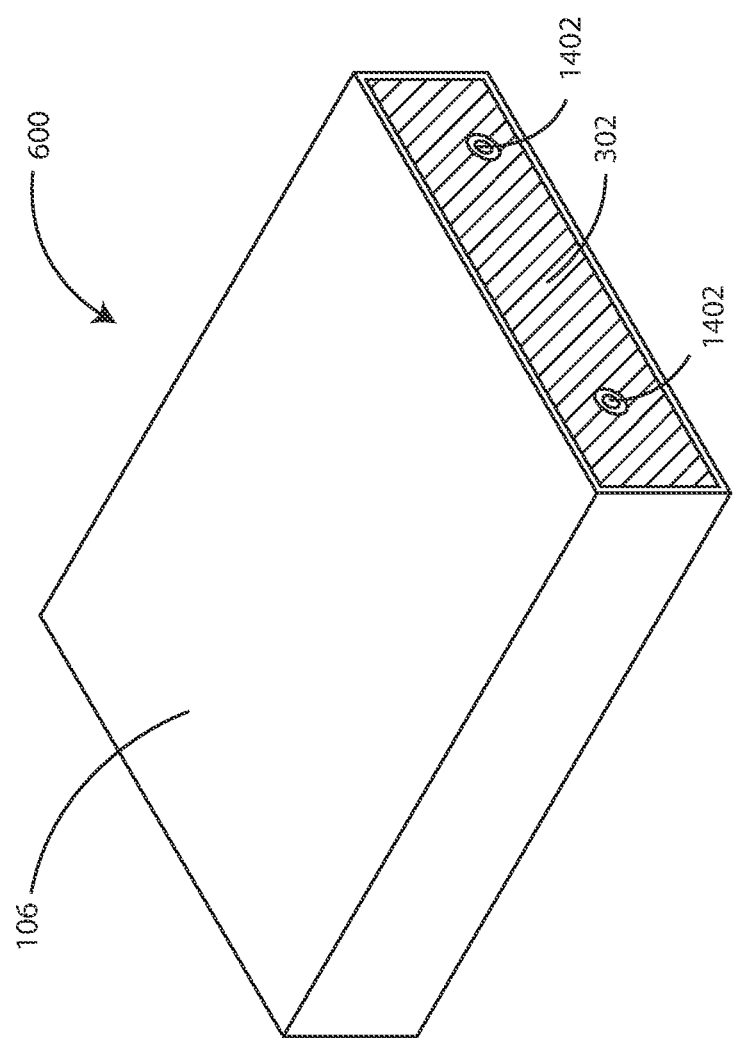
FIG. 15 is a perspective view of a hollow profile in accordance with various embodiments herein.

Referring now to FIG. 15, a perspective view of hollow profile 600 is shown with the molded-in inserts in accordance with various embodiments herein. The hollow profile 600 includes a side wall 106 and a solid portion 302 disposed in the end of the hollow profile 600. The fenestration unit component also includes threaded inserts 1402 molded into the solid portion 302. The threaded inserts 1402 were originally on projections 808 of the die block 802. But, after the flowable composition solidified into the solid portion 302 and the die block 802 has been removed, the threaded inserts 1402 are now stuck in the solid portion 302.

Figure 16:
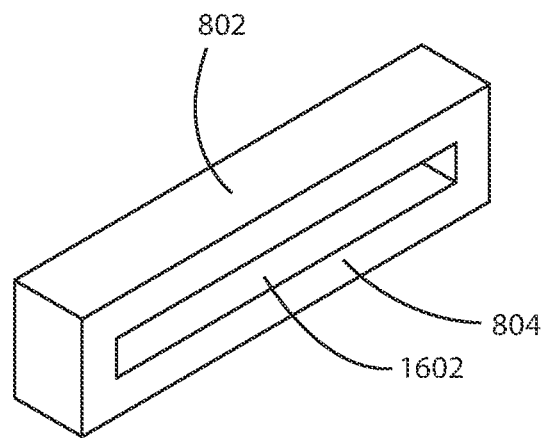
FIG. 16 is a perspective view of a die block in accordance with various embodiments herein.
Figure 17:
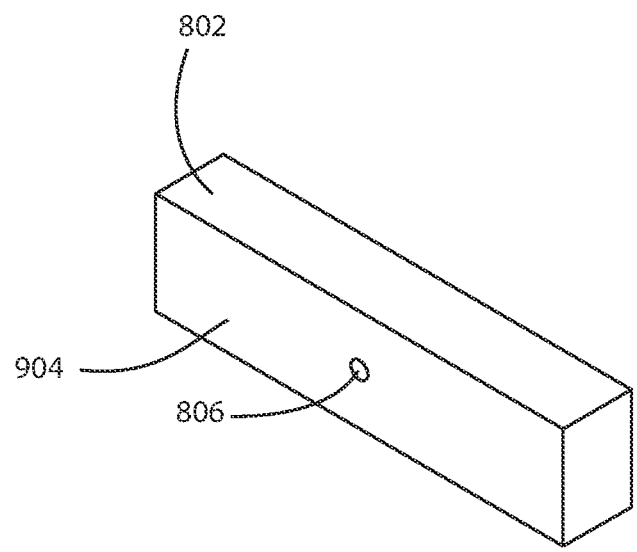
FIG. 17 is a perspective view of a die block in accordance with various embodiments herein.

Die blocks herein can include various physical features for molding purpose such as projections, cavities, and/or combinations of projections and cavities. Referring now to FIG. 16, a perspective view of a die block 802 is shown in accordance with various embodiments herein. In this example, the die block 802 includes an inside surface 804 and a die cavity 1602 formed by or defined by the contours of the inside surface 804. The die cavity 1602 can take the form of various useful features. By way of example, in some embodiments, the die cavity 1602 can be a tenon cavity. Referring now to FIG. 17, a perspective view of a die block 802 is shown from a different angle. The injection port 806 can be seen along with the die outside surface 904.

Figure 18:
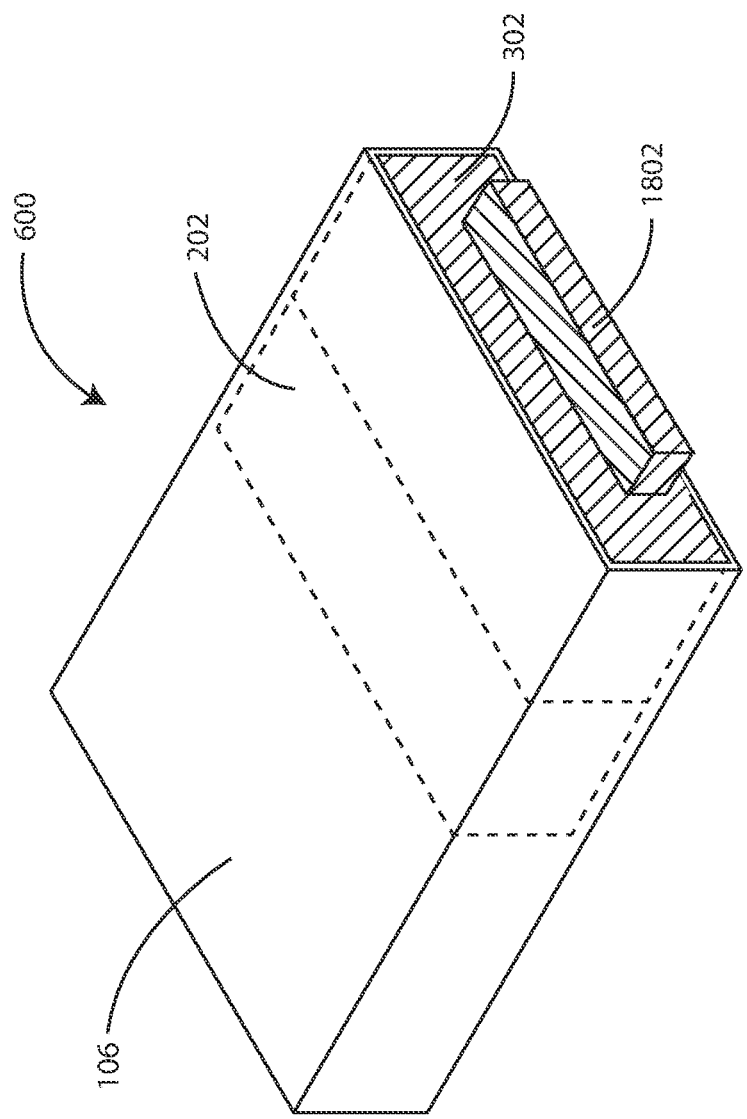
FIG. 18 is a perspective view of a hollow profile in accordance with various embodiments herein.

After the flowable composition is injected or otherwise inserted and allowed to solidify, when the die block 802 is removed, it will leave a feature on the outer face of the solid portion 302 corresponding to the die cavity 1602. Referring now to FIG. 18, a perspective view of hollow profile 600 is shown in accordance with various embodiments herein. The hollow profile 600 includes a side wall 106, a dam 202 and a solid portion 302. The solid portion 302 includes a filler projection 1802 that corresponds to the shape and size of the die cavity 1602 as shown in FIG. 16.

In various embodiments, the filler projection 1802 extends beyond an end of the hollow profile 600. In various embodiments, the solid portion 302 can include a molded external feature. In various embodiments, the filler projection 1802 can include or be a tenon, extension, dowel, peg, locating pin, or the like. In various embodiments, the filler projection 1802 can include or be other structural features.

Figure 19:
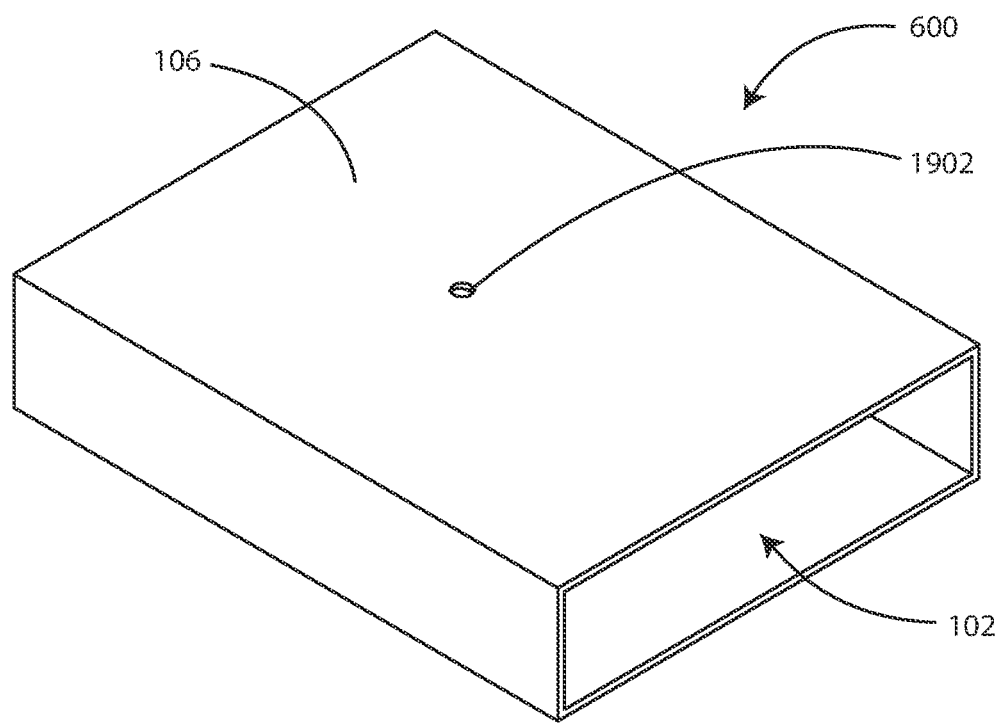
FIG. 19 is a perspective view of a hollow profile in accordance with various embodiments herein.

Referring now to FIG. 19, a perspective view of hollow profile 600 is shown in accordance with various embodiments herein. A fenestration unit component (not shown in this view) includes a hollow profile 600. The hollow profile 600 includes an internal channel 102. The hollow profile 600 also includes a side wall 106. The side wall 106 includes a side injection port 1902.

It will be appreciated that while various embodiments here have shown that the injection port can be defined by a die block, the injection port can also be located in other places. By way of example, the injection port 1902 can be defined by a side wall 106 of the hollow profile 600.

Further, various embodiments herein may lack the use of a die block. For example, in various embodiments herein, a method of preparing a hollow profile for joining can include placing a mold form (which can serve as a particular type of dam) within a channel defined by the hollow profile, wherein the mold form can define a cavity, and injecting a flowable composition through an injection port into the cavity of the mold form, wherein the injection port is defined by a side wall of the hollow profile or the mold form.

Figure 20:
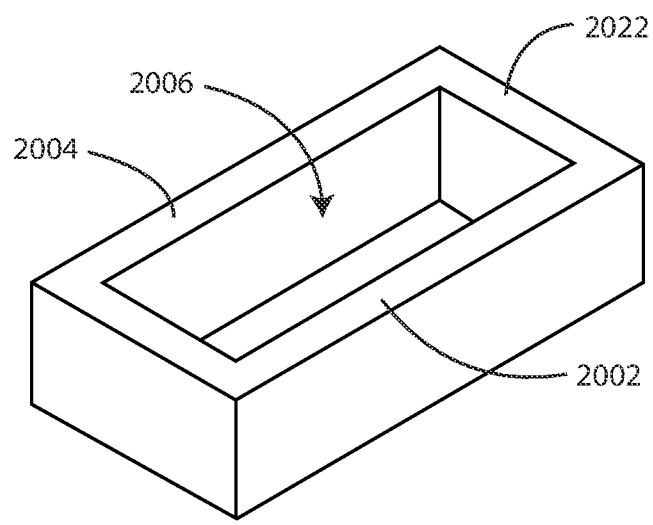
FIG. 20 is a perspective view of a mold form in accordance with various embodiments herein.

Referring now to FIG. 20, a perspective view of a mold form 2022 is shown in accordance with various embodiments herein. In this example, the mold form 2022 can include a front wall 2002 and a back wall 2004. The mold form 2022 also includes an internal mold form cavity 2006 between the front wall 2002 and the back wall 2004.

The injection port (or supply port) shown in FIG. 19 can be disposed along the side wall 106 in a position such that when the mold form 2022 is positioned within channel of the hollow profile, the injection port is disposed between the front wall 2002 and the back wall 2004.

The mold form 2022 can then be positioned within the hollow profile 600.

Figure 21:
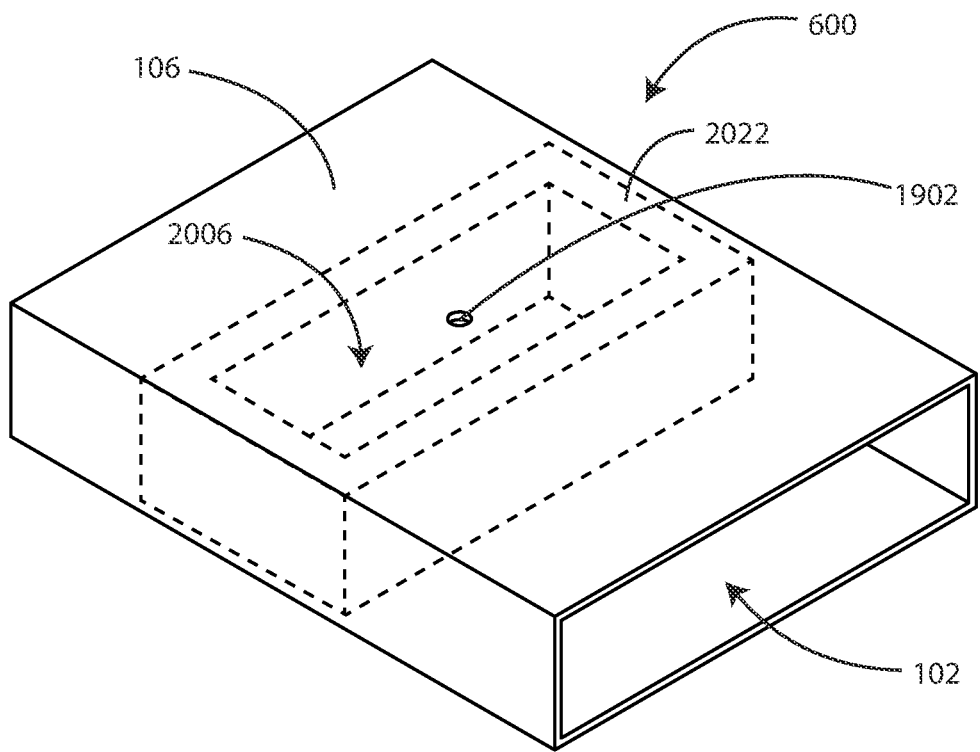
FIG. 21 is a perspective view of a hollow profile in accordance with various embodiments herein.

Referring now to FIG. 21, a perspective view of the hollow profile 600 is shown in accordance with various embodiments herein. The hollow profile 600 includes a side wall 106, an internal channel 102, a side injection port 1902, and the mold form 2022 with the internal mold form cavity 2006.

In specific, the mold form 2022 can be inserted within the channel to specific depth. The mold form 2022 can be inserted into the channel far enough so that the side injection port 1902 lines up with the internal mold form cavity 2006.

In some scenarios herein, a vacuum can be created within the area where the flowable composition is required and then the flowable composition can be pulled or sucked in. By way of example, an aperture can be included to draw air out of the channel and generate a vacuum. The vacuum aperture can be disposed in various places including on at least one of the dam or mold form, the die block (for embodiments including a die block), and/or a side wall of the hollow profile.

Figure 22:
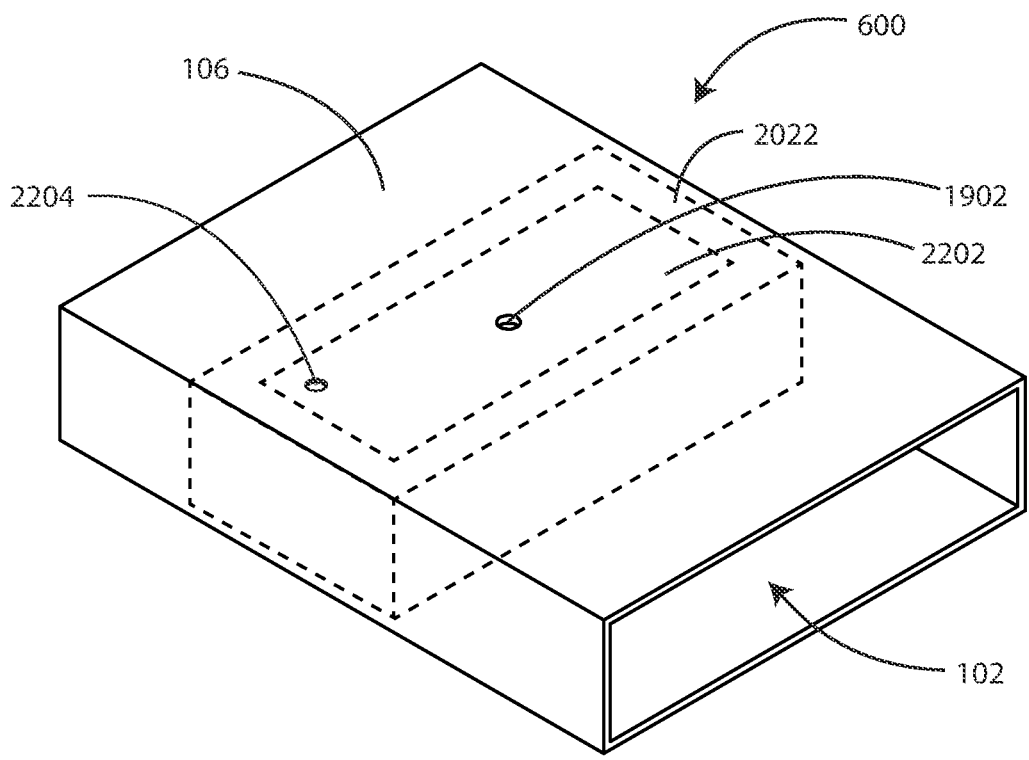
FIG. 22 is a perspective view of a hollow profile in accordance with various embodiments herein.

Whether under the influence of a vacuum or a positive pressure in the supply line for the flowable composition (or both), a flowable composition can be injected or otherwise inserted into internal mold form cavity 2006. Referring now to FIG. 22, a perspective view of hollow profile 600 is shown in accordance with various embodiments herein after injection or insertion of the flowable composition. The hollow profile 600 includes a side wall 106, an internal channel 102. a side injection port 1902, a mold form 2022, and an internal solid portion 2202 disposed within an internal mold form cavity 2006.

In cases where there is no vacuum being used, the air that is initially within the internal mold form cavity 2006 (shown in FIGS. 20 and 21) must have a vent or other pathway through which to escape as it is displaced by the flowable composition is injected or otherwise inserted. In some embodiments, a vent hole 2204 (or multiple vent holes) can be used to allow air to escape that is displaced by the flowable composition. The vent hole 2204 in this example is within the side wall 106. However, the vent hole 2204 can also be located in different areas and on different parts, such as on a wall of the mold form 2022. In some embodiments, the walls of the mold form 2022 can be sufficient porous to the flow of gases that air can escape through the walls of the mold form 2022, even in the absence of an actual vent hole.

In some embodiments, at least one of the dam and the die block can be omitted. By way of example, in many cases, both a dam and a die block are used and together (along with the internal surfaces of a channel in the hollow profile) define an area into which a flowable composition is injected, pulled, pumped, or otherwise placed or deposited. However, in some cases, the hollow profile can be oriented with the channel vertical and gravity can be used to control where the flowable composition is deposited.

Figure 23:
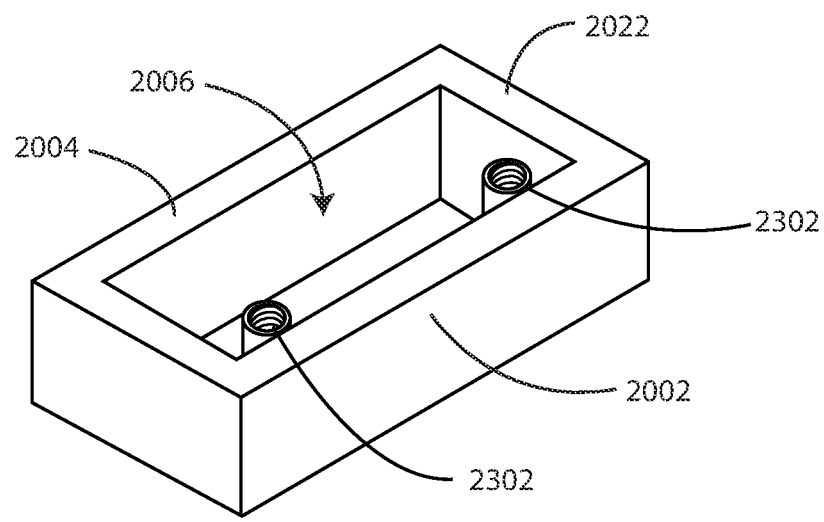
FIG. 23 is a perspective view of a mold form in accordance with various embodiments herein.

Referring now to FIG. 23, a perspective view of a mold form 2022 is shown in accordance with various embodiments herein. As before, the mold form 2022 can include a front wall 2002 and a back wall 2004. The mold form 2022 also includes an internal mold form cavity 2006 between the front wall 2002 and the back wall 2004. However, in this embodiment, the mold form 2022 holds inserts 2302. In this example, the inserts 2302 are within the internal mold form cavity 2006. However, the inserts 2302 can also be held at various other positions and locations.

In some embodiments, the inserts 2302 can be held in a direction that is perpendicular to the extrusion direction of the hollow profile into which the mold form 2022 is inserted. However, the inserts can also be held in a direction that is parallel to the extrusion direction.

The inserts 2302 can be useful for joining the hollow profile to other components including being useful for attaching hinges or other hardware items. In some embodiments, the inserts 2302 can take the form of threaded inserts. The inserts can be formed of many different materials including metals (ferrous metals, brass, alloys, and the like), polymers, composites, ceramics, and the like.

Figure 24:
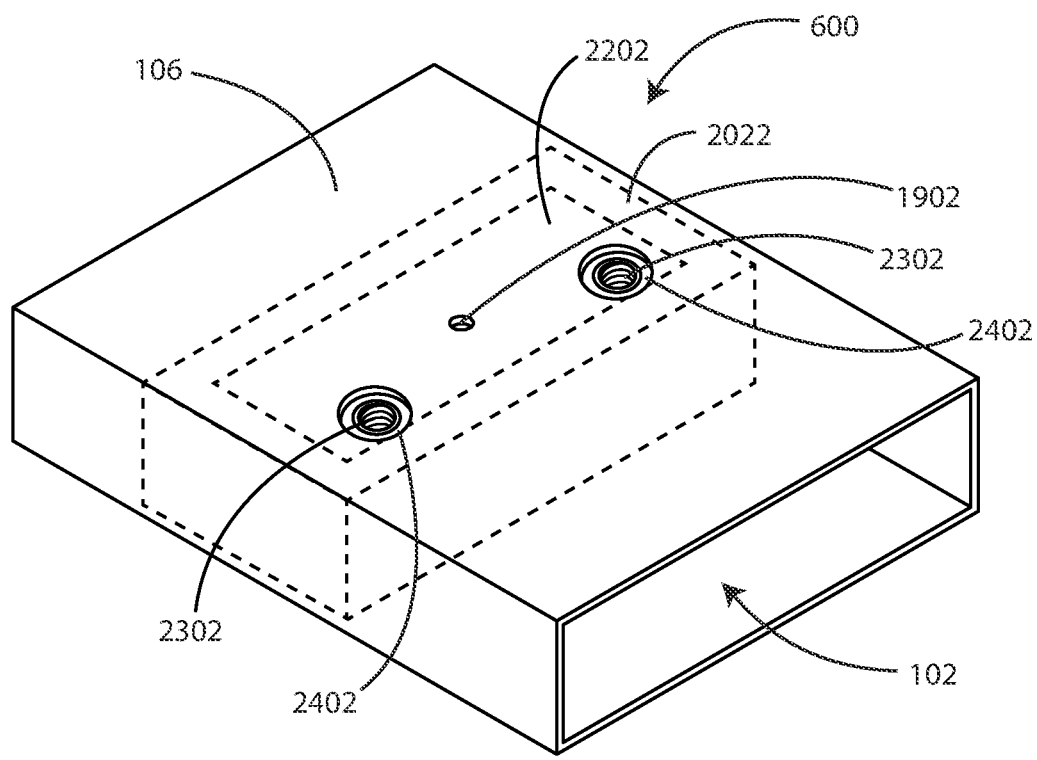
FIG. 24 is a perspective view of a hollow profile in accordance with various embodiments herein.

Referring now to FIG. 24, a perspective view of hollow profile 600 is shown in accordance with various embodiments herein after injection or insertion of the flowable composition. The hollow profile 600 includes a side wall 106, an internal channel 102. a side injection port 1902, a mold form 2022, and an internal solid portion 2202 disposed within the internal mold form cavity 2006 (shown in FIG. 23). Inserts 2302 are also disposed within the internal solid portion 2202. In this example, a milling operation has been performed to create apertures 2402 in order to provide access to the inserts 2302 from the outside.

Figure 25:
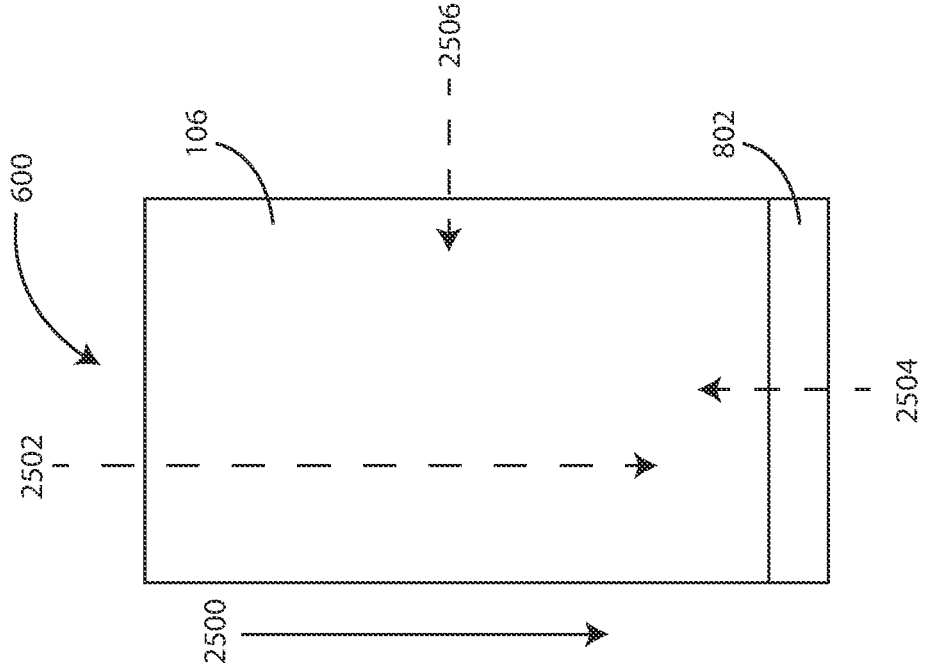
FIG. 25 is an elevation view of hollow profile in accordance with various embodiments herein.

In some embodiments, one of the die block and the dam can be omitted. For example, referring now to FIG. 25, an elevation view of hollow profile 600 is shown in accordance with various embodiments herein illustrating an example of how a dam can be omitted. In this view, the side wall 106 (and channel therein) of the hollow profile 600 is oriented vertically with respect to gravity. FIG. 25 shows a direction of gravity 2500 for this view. A die block 802 is fitted over an end of the hollow profile 600 and the hollow profile is oriented such that the die block 802 is at the downward end. Then, a flowable composition can be inserted into the channel of the hollow profile. By way of example, the flowable composition can be inserted through the upward and open side of the hollow profile as illustrated by first direction 2502. Alternatively, the flowable composition can be inserted from the bottom (such as upward through an injection port on the die block) as illustrated by second direction 2504. The flowable composition can also be inserted from the side through an injection port in the side wall 106 as illustrated by third direction 2506.

Thus, in various embodiments herein, a method of preparing a hollow profile for joining can include fitting a die block over an end of a channel defined by the hollow profile, positioning the hollow profile vertically with the die block down, and inserting a flowable composition into the channel.

In some examples, a dam (as a discrete structure) can be omitted even in the absence orienting the die block downward with respect to gravity. For example, as described further below, the flowable composition may exhibit a viscosity and/or rheology that allows it to function as its own dam.

Figure 26:
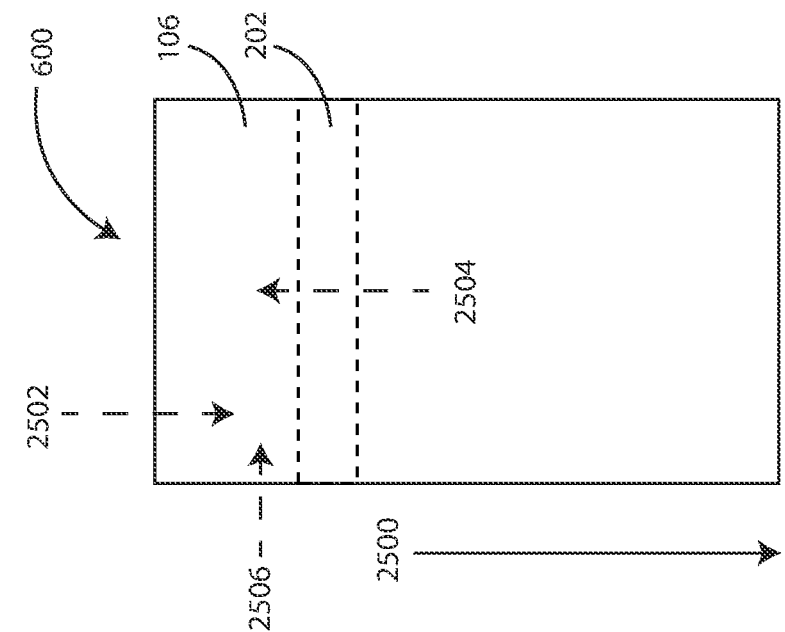
FIG. 26 is an elevation view of a hollow profile in accordance with various embodiments herein.

In some embodiments, the die block can be omitted and just the dam can be used instead. Referring now to FIG. 26, a perspective view of hollow profile 600 is shown in accordance with various embodiments herein. The hollow profile 600 includes a side wall 106 (defining a channel therein) and a dam 202. The hollow profile 600 can be oriented such that the dam 202 is below the area in which the flowable composition is desired with respect to the direction of gravity 2500. The flowable composition can then be inserted into the channel of the hollow profile 600. By way of example, the flowable composition can be inserted through the upward and open side of the hollow profile as illustrated by first direction 2502. Alternatively, the flowable composition can be inserted from the bottom (such as upward through an injection port on the dam) as illustrated by second direction 2504. The flowable composition can also be inserted from the side through an injection port in the side wall 106 as illustrated by third direction 2506.

Thus, in various embodiments herein, a method of preparing a hollow profile for joining can include fitting a dam within a channel defined by the hollow profile, positioning the hollow profile vertically with the dam side down (below the area where deposition of the flowable composition is desired), and inserting a flowable composition into the channel.

In some embodiments, a solid profile (e.g. always existing as a solid or solidified prior to use for this embodiment) can be inserted into a hollow profile and the solid profile can be cut to a desired length either before or after it is inserted into the hollow profile.

Figure 27:
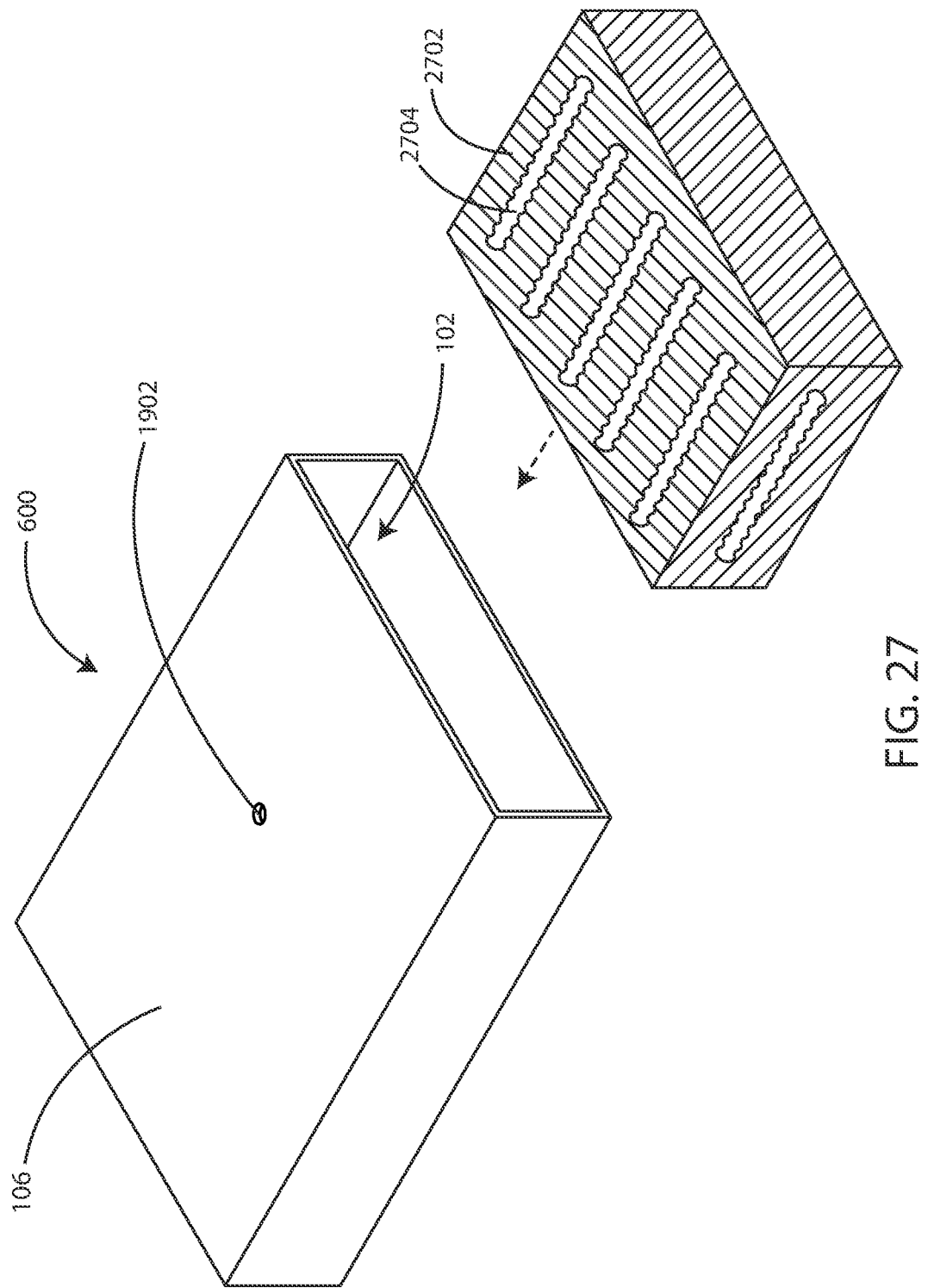
FIG. 27 is a perspective view of a hollow profile in accordance with various embodiments herein.

Referring now to FIG. 27, a perspective view of hollow profile 600 is shown in accordance with various embodiments herein. The hollow profile 600 includes a side wall 106 and an internal channel 102. A solid profile 2702 is also included as ready for insertion into the internal channel 102. The solid profile 2702 can have an outer perimeter cross-sectional shape 204 matching a cross-sectional shape of the inner surface of the channel 102 of the hollow profile 600.

In this view, an adhesive composition 2704 is disposed on the solid profile 2702. However, the adhesive composition 2704 could also be disposed on interior surfaces of the internal channel 102 or in both places.

Further, in some embodiments the solid profile 2702 can be inserted into the internal channel 102 before adhesive is applied. For example, an injection port 1902 can be disposed on the side wall 106 in some embodiments and after the solid profile 2702 has been inserted then a flowable composition that can act as an adhesive can be injected in order to bond the solid profile 2702 into position within the internal channel 102.

As such, in various embodiments, a method of preparing a hollow profile for joining can include forming or otherwise obtaining a solid profile with an outer perimeter shape matching an inner surface of a channel of a hollow profile, applying an adhesive composition to at least one of inner surfaces of the channel and the outer perimeter of the solid profile, inserting the solid profile into the channel of the hollow profile, and cutting the solid profile to a desire length. In some cases, cutting the solid profile to a desire length occurs prior to the inserting the solid profile into the channel of the hollow profile. However, in some cases, cutting the solid profile to a desire length occurs after inserting the solid profile into the channel of the hollow profile.

Methods

Many different methods are contemplated herein, including, but not limited to, methods of making hollow profiles, methods of preparing hollow profiles for joining operations, methods of using hollow profiles, and the like. It will be appreciated that aspects of operations described elsewhere herein can be performed as operations of one or more methods in accordance with various embodiments herein.

Figure 28:
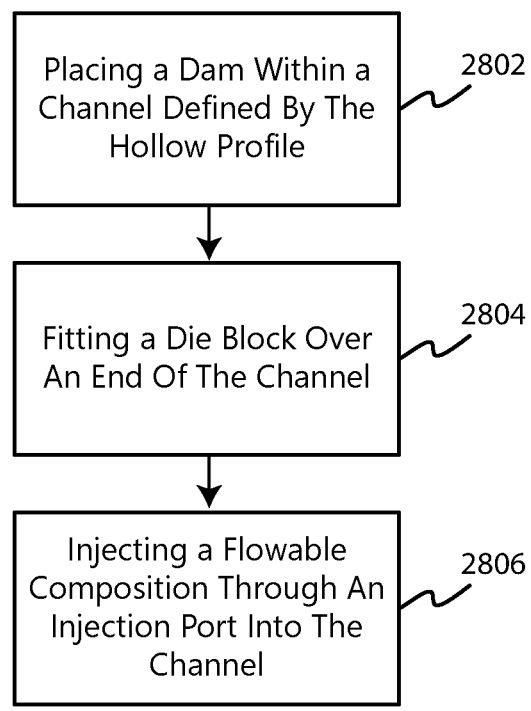
FIG. 28 is a flowchart of a method in accordance with various embodiments herein.

In an embodiment, a method of preparing a hollow profile for joining is included. The method can include (with reference to FIG. 28) placing a dam within a channel defined by the hollow profile 2802, fitting a die block over an end of the channel 2804, and injecting a flowable composition through an injection port into the channel 2806.

In an embodiment, the method can further include removing the die block from the end of the channel.

In an embodiment, the method can further include inserting the dam within the channel to a specific depth. In an embodiment, the method can further include inserting the dam within the channel to specific depth through hydraulic pressure simultaneously with injecting the flowable composition.

In an embodiment, the method can further include allowing the flowable composition to transform into a solid before performing later milling operations.

In an embodiment, the method can further include milling a portion of the hollow profile including an area with the flowable composition. In an embodiment, the method can further include milling a portion of the hollow profile including an area with the flowable composition to form a flat joining surface. In an embodiment, the method can further include drilling holes in a portion of the hollow profile including an area with the flowable composition.

Figure 29:
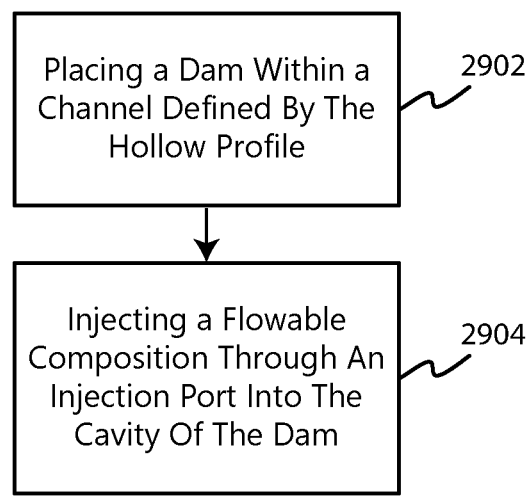
FIG. 29 is a flowchart of a method in accordance with various embodiments herein.

In an embodiment, another method of preparing a hollow profile for joining is included, the method including (illustrated with reference to FIG. 29) placing a dam within a channel defined by the hollow profile 2902, wherein the dam comprises a front wall and a back wall and defines a cavity between the front wall and the back wall, and injecting a flowable composition through an injection port into the cavity of the dam 2904, wherein the injection port is defined by a side wall of the hollow profile or the dam.

Figure 30:
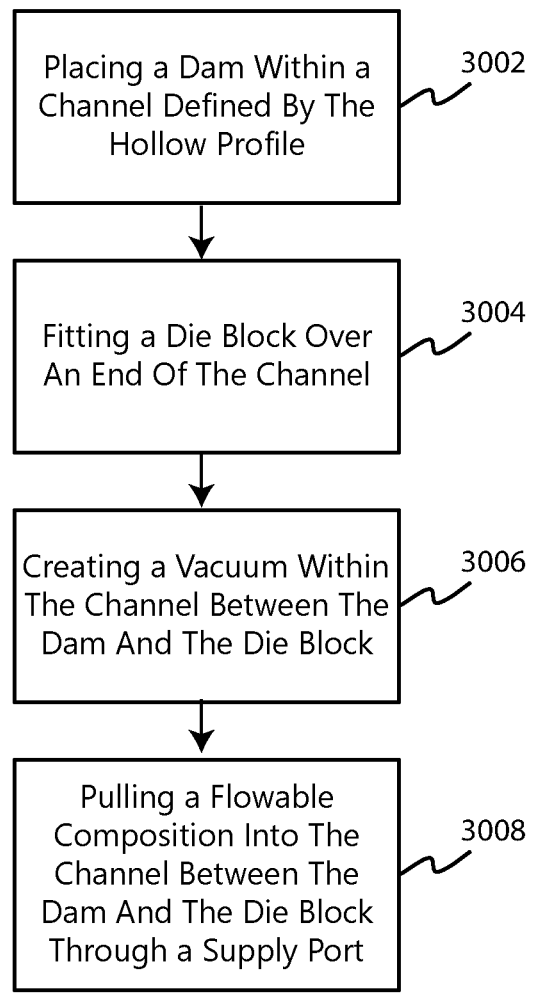
FIG. 30 is a flowchart of a method in accordance with various embodiments herein.

In an embodiment, another method of preparing a hollow profile for joining is included. The method can include (with reference to FIG. 30) placing a dam within a channel defined by the hollow profile 3002, fitting a die block over an end of the channel 3004, creating a vacuum within the channel between the dam and the die block 3006, and pulling a flowable composition into the channel between the dam and the die block through a supply port 3008.

Figure 31:
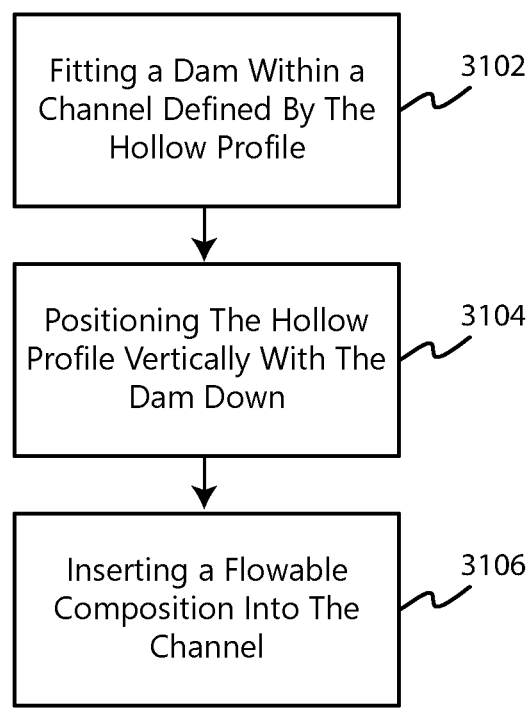
FIG. 31 is a flowchart of a method in accordance with various embodiments herein.

In an embodiment, another method of preparing a hollow profile for joining is included. The method can include (with reference to FIG. 31) fitting a dam within a channel defined by the hollow profile 3102, positioning the hollow profile vertically with the dam down 3104, and inserting a flowable composition into the channel 3106.

Figure 32:
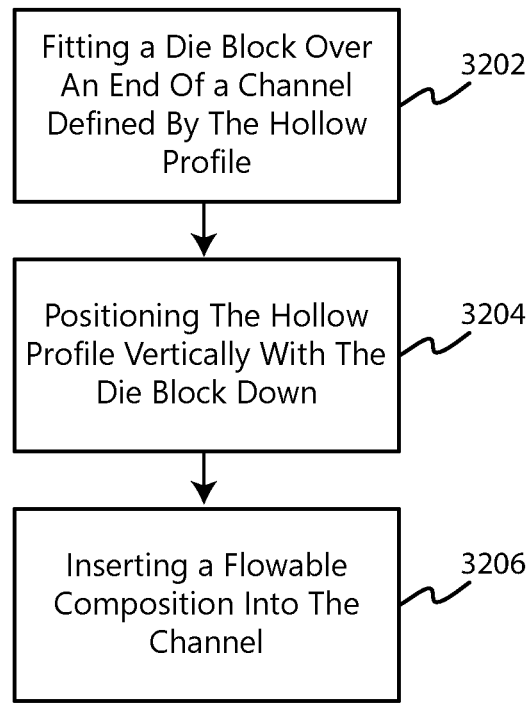
FIG. 32 is a flowchart of a method in accordance with various embodiments herein.

In an embodiment, another method of preparing a hollow profile for joining is included. The method can include (with reference to FIG. 32) fitting a die block over an end of a channel defined by the hollow profile 3202, positioning the hollow profile vertically with the die block down 3204, and inserting a flowable composition into the channel 3206.

Figure 33:
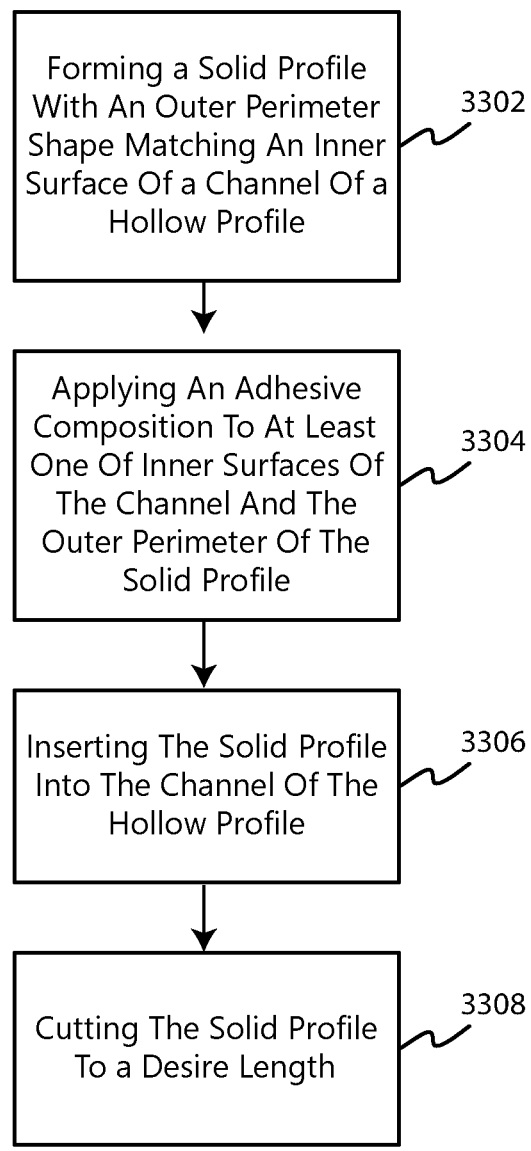
FIG. 33 is a flowchart of a method in accordance with various embodiments herein.

In an embodiment, another method of preparing a hollow profile for joining is included. The method can include (with reference to FIG. 33) forming a solid profile with an outer perimeter shape matching an inner surface of a channel of a hollow profile 3302, applying an adhesive composition to at least one of inner surfaces of the channel and the outer perimeter of the solid profile 3304, inserting the solid profile into the channel of the hollow profile 3306, and cutting the solid profile to a desire length 3308.

In an embodiment of the method, cutting the solid profile to a desire length occurs prior to the inserting the solid profile into the channel of the hollow profile. In an embodiment of the method, cutting the solid profile to a desire length occurs after the inserting the solid profile into the channel of the hollow profile.

In an embodiment, the method can further include inserting the solid profile within the channel to specific depth.

In an embodiment, the method can further include mechanically modifying a portion of the hollow profile including an area with the solid profile. In an embodiment, the method can further include cross-milling a portion of the hollow profile including an area with the solid profile. In an embodiment, the method can further include drilling holes in a portion of the hollow profile including an area with the solid profile.

Figure 34:
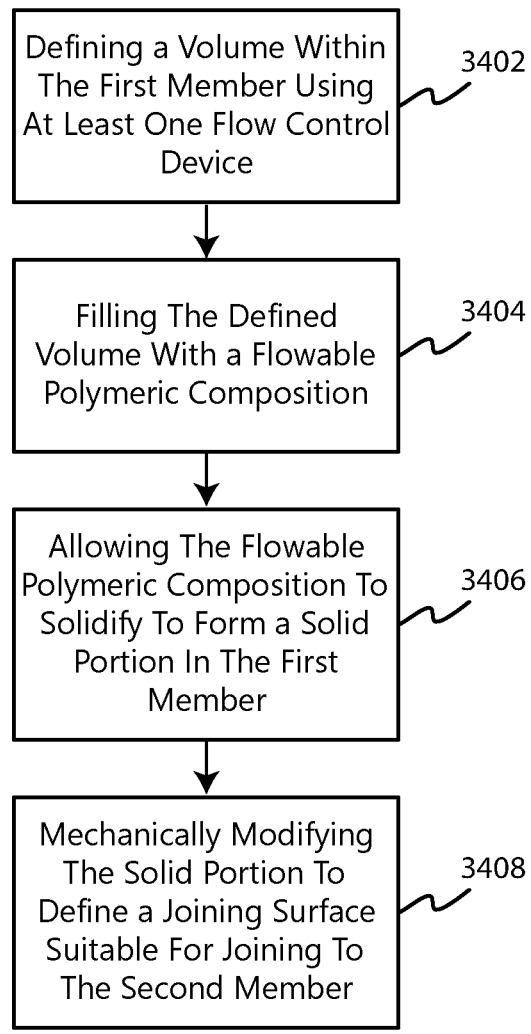
FIG. 34 is a flowchart of a method in accordance with various embodiments herein.

In an embodiment, another method of preparing a first member for joining to a second member is included herein. The first member can include a hollow portion. With reference to FIG. 34, the method can include defining a volume within the first member using at least one flow control device 3402. The method can also include filling the defined volume with a flowable polymeric composition 3404. The method can also include allowing the flowable polymeric composition to solidify to form a solid portion in the first member 3406. The method can also include mechanically modifying the solid portion to define a joining surface suitable for joining to the second member 3408. In an embodiment, the method can further include joining the first member to the second member. In an embodiment of the method, joining the first member to the second member further comprises inserting mechanical fasteners. In an embodiment of the method, joining the first member to the second member further comprises inserting threaded mechanical fasteners.

In an embodiment, the method can further include adding a sealing layer between the first member and the second member. In an embodiment of the method, the sealing layer comprises a gasket (such as a polymeric gasket).

In an embodiment of the method, filling the defined volume with a flowable polymeric composition further comprises pressure injection of the flowable polymeric composition. In an embodiment of the method, a position of the at least one flow control device is determined by a quantity of the flowable polymeric material injected.

In an embodiment of the method, the at least one flow control device comprises a mold feature for producing a molded-in feature in the solid portion. In an embodiment of the method, the at least one flow control device defines an external surface of the solid portion. In an embodiment of the method, the at least one flow control device defines an injection port. In an embodiment of the method, the at least one flow control device comprises a non-adhesive surface configured to contact the flowable polymeric composition.

In an embodiment of the method, the solidification of the flowable polymeric composition includes a chemical reaction. In an embodiment of the method, the solidification of the flowable polymeric composition includes cooling down the flowable polymeric composition.

In an embodiment of the method, the flowable composition comprises at least one an additive selected from the group consisting of inorganic particulates, organic particulates, inorganic fibers, organic fibers, impact modifiers, and adhesion promoters.

In an embodiment of the method, the flowable polymeric composition comprises a thermoplastic material. In an embodiment of the method, the flowable composition adheres to the first member.

In an embodiment, the method can further include providing an injection port in the first member.

In an embodiment of the method, the first member comprises an extrusion or pultrusion.

In an embodiment of the method, at least one of the flow control devices comprises a foam block.

In an embodiment of the method, mechanical modification comprises at least one of milling and cutting.

Flowable Compositions

Various embodiments herein include a flowable compositions. Further details about the flowable compositions are provided as follows. However, it will be appreciated that this is merely provided by way of example and that further variations are contemplated herein.

The choice of material for the flowable composition is not particularly limited, provided that it exhibits sufficient strength to aid in forming durable and long lasting joint without significant deterioration over the life of a fenestration component such as a window or a door.

In various embodiments, the flowable composition can include a polymeric composition. In various embodiments, the flowable composition can include a curable composition. In various embodiments, the flowable composition can include a thermoplastic composition. In various embodiments, the flowable composition can include a hot melt adhesive. In various embodiments, the flowable composition can include a structural adhesive. In various embodiments, the flowable composition can include a composite thermoplastic composition.

Exemplary polymers can include both thermoplastic and thermoset polymers. In various embodiments, exemplary polymers can include various homopolymers, copolymers, polymer alloys, and crosslinked polymers. In various embodiments, the polymer can include or be a polyisobutylene, a polysiloxane (silicone), polyamide, polyvinyl acetate, or a polyurethane.

Flowable compositions herein can include silicone materials such as silicone RTV (room temperature vulcanizing) sealants. Hot melt silicone materials can also be used in some embodiments. Both types of silicone materials are available in various grades from Dow Corning Corporation, Midland, Mich.

In various embodiments herein, flowable compositions can include a curable polymer, such as in a one-part or multi-part reaction curing polymer composition.

The flowable compositions herein can have various viscosities and rheology. In some embodiments, the viscosity can be greater than or equal to 1000 cps, 12000 cps, 24000 cps, 36000 cps, 48000 cps, or 60000 cps. In some embodiments, the viscosity can be less than or equal to 250000 cps, 200000 cps, 175000 cps, 125000 cps, 100000 cps, or 50000 cps. In some embodiments, the viscosity can fall within a range of 1000 cps to 250000 cps, or 12000 cps to 200000 cps, or 25000 cps to 175000 cps, or 36000 cps to 125000 cps, or 50000 cps to 100000 cps, as measured using a rotational viscometer with a #6 spindle at 20 rpm and at 75 degrees Fahrenheit.

In some cases, the viscosity of the composition can change as a result of shear forces, a chemical reaction, and/or a temperature change. For example, in some embodiments, the composition can be formulated to shear thin during injection, but quickly build viscosity, in some cases sufficiently so that it can effectively form its own dam. Similarly, in some cases, an adjustable set time adhesive can allow the flowable composition to set quickly so as to form its own dam.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method of preparing a hollow profile for joining comprising:
    placing a dam within a channel defined by the hollow profile;
    fitting a die block over an end of the channel;
    injecting a flowable composition through an injection port into the channel;
    mechanically modifying a portion of the hollow profile including an area with the flowable composition.

2. The method of preparing a hollow profile for joining of claim 1, further comprising removing the die block from the end of the channel.

3. The method of preparing a hollow profile for joining of claim 1, wherein the injection port is defined by the die block.

4. The method of preparing a hollow profile for joining of claim 1, wherein the injection port is defined by a side wall of the hollow profile.

5. The method of preparing a hollow profile for joining of claim 1, further comprising inserting the dam within the channel to a specific depth through hydraulic pressure simultaneously with injecting the flowable composition.

6. The method of preparing a hollow profile for joining of claim 1, wherein the dam comprises a foam plug.

7. The method of preparing a hollow profile for joining of claim 1, wherein a perimeter shape of the dam is complementary to an interior shape of the channel.

8. The method of preparing a hollow profile for joining of claim 1, wherein the die block comprises an inside surface and at least one projection disposed on the inside surface.

9. The method of preparing a hollow profile for joining of claim 8, wherein the projection defines the injection port.

10. The method of preparing a hollow profile for joining of claim 8, further comprising a threaded insert disposed on the projection.

11. The method of preparing a hollow profile for joining of claim 8, wherein the dam comprises an outside surface and at least one cavity is disposed on the outside surface that is complementary to the at least one projection on the inside surface of the die block.

12. The method of preparing a hollow profile for joining of claim 1, wherein the die block comprises an inside surface and a non-stick coating or a tape over the inside surface.

13. The method of preparing a hollow profile for joining of claim 1, wherein the die block comprises polyolefin, polytetrafluoroethylene, polypropylene or polyethylene.

14. The method of preparing a hollow profile for joining of claim 1, wherein the flowable composition comprises a curable composition.

15. The method of preparing a hollow profile for joining of claim 1, further comprising allowing the flowable composition to transform into a solid before performing later mechanical modification operations.

16. The method of preparing a hollow profile for joining of claim 1, further comprising milling a portion of the hollow profile including an area with the flowable composition.

17. The method of preparing a hollow profile for joining of claim 1, further comprising milling a portion of the hollow profile including an area with the flowable composition to form a flat joining surface.

18. The method of preparing a hollow profile for joining of claim 1, further comprising drilling holes in a portion of the hollow profile including an area with the flowable composition.

19. A method of preparing a hollow profile for joining comprising:
  placing a dam within a channel defined by the hollow profile;
  fitting a die block over an end of the channel, wherein the die block comprises an inside surface and at least one projection disposed on the inside surface; and
  injecting a flowable composition through an injection port into the channel.

20. The method of preparing a hollow profile for joining of claim 19, wherein the injection port is defined by the die block.

21. A method of preparing a hollow profile for joining comprising:
  placing a dam within a channel defined by the hollow profile;
  fitting a die block over an end of the channel;
  injecting a flowable composition through an injection port into the channel; and
  drilling holes in a portion of the hollow profile including an area with the flowable composition.

* * * * *